(12) United States Patent
Umeda et al.

(10) Patent No.: US 12,384,365 B2
(45) Date of Patent: Aug. 12, 2025

(54) LANE CHANGE PREDICTION SYSTEM AND LANE CHANGE PREDICTION METHOD

(71) Applicant: Mitsubishi Electric Corporation, Tokyo (JP)

(72) Inventors: Taku Umeda, Tokyo (JP); Takuji Morimoto, Tokyo (JP); Tomoki Uno, Tokyo (JP); Yuta Takashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 115 days.

(21) Appl. No.: 18/340,238

(22) Filed: Jun. 23, 2023

(65) Prior Publication Data

US 2024/0116504 A1     Apr. 11, 2024

(30) Foreign Application Priority Data

Sep. 22, 2022   (JP) ................................. 2022-151078

(51) Int. Cl.
*B60W 30/095*   (2012.01)
*B60W 30/18*    (2012.01)
*B60W 60/00*    (2020.01)

(52) U.S. Cl.
CPC .. *B60W 30/0956* (2013.01); *B60W 30/18163* (2013.01); *B60W 2552/10* (2020.02); *B60W 2554/4045* (2020.02); *B60W 2554/802* (2020.02); *B60W 2554/804* (2020.02); *B60W 2720/10* (2013.01)

(58) Field of Classification Search
CPC .......... B62D 15/0255; B60W 30/0956; B60W 30/18163; B60W 2552/10; B60W 2554/4045; B60W 2554/802; B60W 2554/804; B60W 2720/10; B60W 2552/53; B60W 60/0027; G08G 1/167
USPC ......................................... 701/26
See application file for complete search history.

(56) References Cited

U.S. PATENT DOCUMENTS

2019/0143972 A1 *  5/2019  Ishioka ............... B60W 30/162
                                                     701/70
2019/0270453 A1    9/2019  Katsura et al.
2019/0329778 A1 * 10/2019  D'sa ..................... G06V 20/56
(Continued)

FOREIGN PATENT DOCUMENTS

JP        2019-153028 A      9/2019

OTHER PUBLICATIONS

Koji Tanida et al., "Modeling of Expressway Merging Behavior for Autonomous Vehicle Control", Transactions of the Society of Automotive Engineers of Japan, Inc., Jul. 2017, pp. 885-890, vol. 48, No. 4.

*Primary Examiner* — Rachid Bendidi
*Assistant Examiner* — Hossam M Abd El Latif
(74) *Attorney, Agent, or Firm* — Sughrue Mion, PLLC

(57) ABSTRACT

To provide a lane change prediction system and a lane change prediction method which can predict whether the merging vehicle interrupts on the front side or the back side of the object vehicle. A lane change prediction system, when the peripheral vehicle which exists around the object vehicle is a merging vehicle, predicts whether the merging vehicle interrupts on a front side or a back side of the object vehicle, based on a detection value of the relative position with respect to the object vehicle, a detection value of the relative speed, and a positive or negative of the detection value of the relative speed.

14 Claims, 13 Drawing Sheets

(56) References Cited

U.S. PATENT DOCUMENTS

| | | | | |
|---|---|---|---|---|
| 2019/0375382 A1* | 12/2019 | Nakatsuka | ................ | B60T 7/14 |
| 2020/0189592 A1* | 6/2020 | Jang | ...................... | B60W 30/18 |
| 2020/0406892 A1* | 12/2020 | Yu | ........................ | B60W 10/20 |
| 2022/0055619 A1* | 2/2022 | Yang | ..................... | B60W 30/09 |
| 2023/0202530 A1* | 6/2023 | Abad | ................... | G08G 1/0133 |
| | | | | 701/26 |
| 2023/0406304 A1* | 12/2023 | Hiremath | .............. | B60W 30/17 |

* cited by examiner

LANE CHANGE PREDICTION SYSTEM AND LANE CHANGE PREDICTION METHOD

INCORPORATION BY REFERENCE

The disclosure of Japanese Patent Application No. 2022-151078 filed on Sep. 22, 2022 including its specification, claims and drawings, is incorporated herein by reference in its entirety.

BACKGROUND

The present disclosure is related with a lane change prediction system and a lane change prediction method.

Patent document 1 discloses the technology that when a road shape which causes interruption is acquired, and a monitoring object vehicle which may interrupt is detected, an avoidance preparation for preparing for interruption of the monitoring object vehicle is performed, and an avoidance operation is performed.

In FIG. 6 of nonpatent document 1, it is shown that whether the merging vehicle interrupts on the front side or the back side of the ego vehicle can be classified, based on the relative position and the relative speed of the merging vehicle.

Patent document 1: JP 2019-153028 A

Nonpatent document 1: Koji Tanida, Masahiro Kimura, Yuichi Yoshida, "Modeling of Expressway Merging Behavior for Autonomous Vehicle Control", Transactions of the Society of Automotive Engineers of Japan, Inc. Vol. 48, No. 4, 2017, 885-890

SUMMARY

By the way, when the peripheral vehicle of the ego vehicle is the merging vehicle, it is required to predict whether the merging vehicle interrupts on the front side or the back side of the ego vehicle, for safe driving of the ego vehicle and the merging vehicle, and the like.

However, patent document 1 does not disclose a method of estimating whether the monitoring object vehicle interrupts on the front side or the back side with respect to the ego vehicle.

In nonpatent document 1, although the boundary line which classifies whether the merging vehicle interrupts on the front side or the back side is lined so as to suit experimental data, it is lined only on the positive side of the relative speed, but it is not lined on the negative side of the relative speed, and it cannot be classified on the negative side of the relative speed. In nonpatent document 1, the boundary line is lined only so as to suit experimental data, what kind of physical meaning the boundary line has is not shown clearly, and there is no versatility.

Then, the purpose of the present disclosure is to provide a lane change prediction system and a lane change prediction method which can predict whether the merging vehicle interrupts on the front side or the back side of the object vehicle, on the positive side and the negative side of the relative speed of the merging vehicle with respect to the object vehicle.

A lane change prediction system according to the present disclosure including:
 a peripheral information acquisition unit that detects a peripheral vehicle which exist around an object vehicle, and detects a relative position and a relative speed of the peripheral vehicle with respect to the object vehicle in a longitudinal direction of the object vehicle;
 a road information acquisition unit that acquires lane information where the object vehicle is traveling, and lane information where the peripheral vehicle is traveling;
 a merging vehicle determination unit that determines whether or not the peripheral vehicle is a merging vehicle which merges to a lane where the object vehicle is traveling, based on the lane information where the object vehicle is traveling, and the lane information where the peripheral vehicle is traveling; and
 an interruption prediction unit that, when the peripheral vehicle is the merging vehicle, predicts whether the merging vehicle interrupts on a front side or a back side of the object vehicle, based on a detection value of the relative position, a detection value of the relative speed, and a positive or negative of the detection value of the relative speed.

A lane change prediction method according to the present disclosure including:
 a peripheral information acquisition step of detecting a peripheral vehicle which exist around an object vehicle, and detecting a relative position and a relative speed of the peripheral vehicle with respect to the object vehicle in a longitudinal direction of the object vehicle;
 a road information acquisition step of acquiring lane information where the object vehicle is traveling, and lane information where the peripheral vehicle is traveling;
 a merging vehicle determination step of determining whether or not the peripheral vehicle is a merging vehicle which merges to a lane where the object vehicle is traveling, based on the lane information where the object vehicle is traveling, and the lane information where the peripheral vehicle is traveling; and
 an interruption prediction step of predicting whether the merging vehicle interrupts on a front side or a back side of the object vehicle, based on a detection value of the relative position, a detection value of the relative speed, and a positive or negative of the detection value of the relative speed, when the peripheral vehicle is the merging vehicle.

According to the lane change prediction system and the lane change prediction method according to the present disclosure, based on the detection value of the relative position, the detection value of the relative speed, and the positive or negative of the detection value of the relative speed of the merging vehicle, whether the merging vehicle interrupts on the front side or the back side of the object vehicle can be predicted. At this time, since the positive or negative of detection value of the relative speed of the merging vehicle is considered, the interruption prediction can be performed on the positive side and the negative side of the relative speed of the merging vehicle. Since the positive or negative of detection value of the relative speed of the merging vehicle is considered, the case where the merging vehicle merges while decelerating and the case where the merging vehicle merges while accelerating can be estimated separately, and estimation accuracy can be improved.

DETAILED DESCRIPTION OF THE EMBODIMENTS

1. Embodiment 1

A lane change prediction system 1 according to Embodiment 1 will be explained with reference to drawings. In the present embodiment, the lane change prediction system 1 is provided in an object vehicle (ego vehicle). The lane change prediction system 1 is embedded in a vehicle control apparatus 50.

Figure 1:
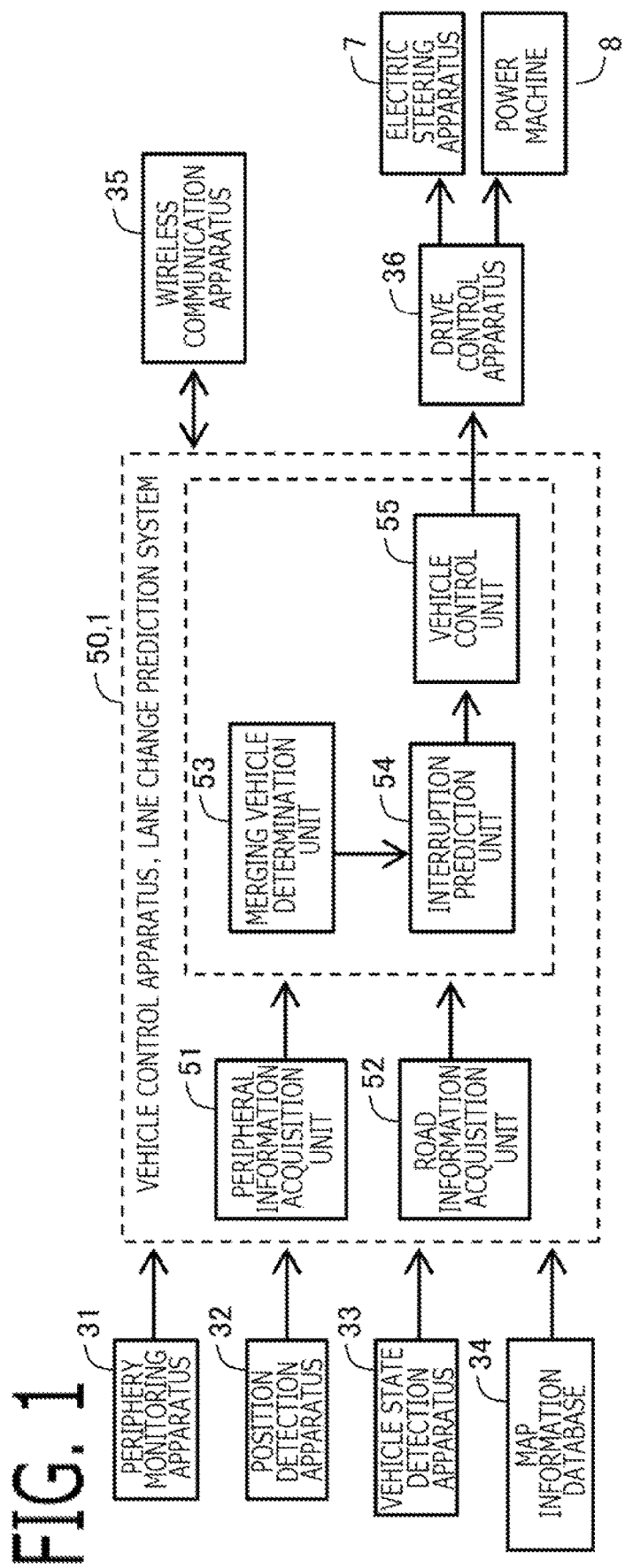
FIG. 1 is a schematic block diagram of the vehicle control apparatus and the lane change prediction system according to Embodiment 1.

As shown in FIG. 1, the object vehicle (ego vehicle) is provided with a periphery monitoring apparatus 31, a position detection apparatus 32, a vehicle state detection apparatus 33, a map information database 34, a wireless communication apparatus 35, a vehicle control apparatus 50, a drive control apparatus 36, a power machine 8, an electric steering apparatus 7, and the like.

The periphery monitoring apparatus 31 is an apparatus which monitors the periphery of vehicle, such as a camera and a radar. As the radar, a millimeter wave radar, a laser radar, an ultrasonic radar, and the like are used. The wireless communication device 35 performs a wireless communication with a base station, using the wireless communication standard of cellular communication system, such as 4G and 5G.

The position detecting apparatus 32 is an apparatus which detects the current position (latitude, longitude, altitude) of the ego vehicle, and a GPS antenna which receives the signal outputted from satellites, such as GNSS (Global Navigation Satellite System), is used. For detection of the current position of the ego vehicle, various kinds of methods, such as the method using the traveling lane identification number of the ego vehicle, the map matching method, the dead reckoning method, and the method using the detection information around the ego vehicle, may be used.

In the map information database 34, road information, such as a road shape (for example, a lane number, a position of each lane, a shape of each lane, a type of each lane, a road type, a regulation speed, and the like), a sign, and a road signal, is stored. The type of each lane includes a merging lane which merges into a main lane, and the main lane into which the merging lane merges. The map information database 34 is mainly constituted of a storage apparatus. The map information database 34 may be provided in a server outside the vehicle connected to the network, and the vehicle control apparatus 50 may acquire required road information from the server outside the vehicle via the wireless communication apparatus 35.

As the drive control apparatus 36, a power controller, a brake controller, an automatic steering controller, a light controller, and the like are provided. The power controller controls output of a power machine 8, such as an internal combustion engine and a motor. The brake controller controls brake operation of an electric brake apparatus. The automatic steering controller controls an electric steering apparatus 7. The light controller controls a direction indicator, a hazard lamp, and the like.

The vehicle condition detection apparatus 33 is a detection apparatus which detects an ego vehicle state which is a driving state and a traveling state of the ego vehicle. In the present embodiment, the vehicle state detection apparatus 33 detects a speed, an acceleration, a yaw rate, a steering angle, a lateral acceleration and the like of the ego vehicle, as the traveling state of the ego vehicle. For example, as the vehicle state detection apparatus 33, a speed sensor which detects a rotational speed of wheels, an acceleration sensor, an angular velocity sensor, a steering angle sensor, and the like are provided.

As the driving state of the ego vehicle, an acceleration or deceleration operation, a steering angle operation, and a lane change operation by a driver are detected. For example, as the vehicle state detection apparatus 33, an accelerator position sensor, a brake position sensor, a steering angle sensor (handle angle sensor), a steering torque sensor, a direction indicator position switch, and the like are provided.

1-1. Vehicle Control Apparatus 50

Figure 2:
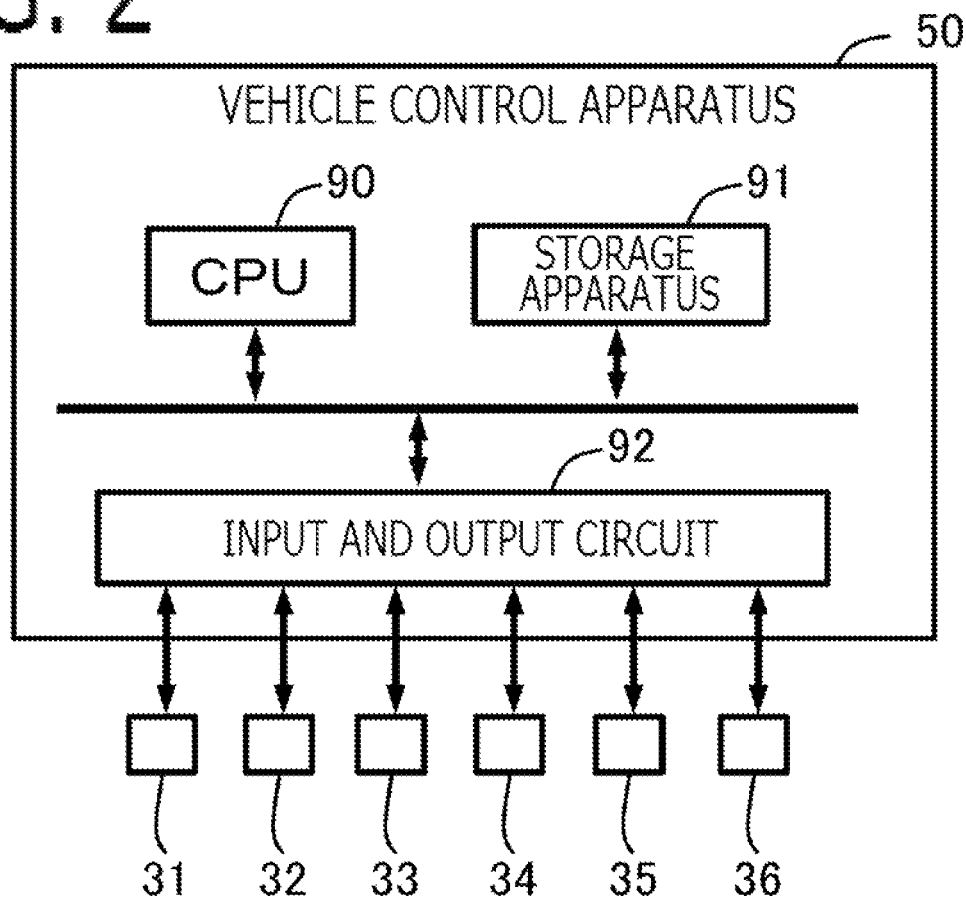
FIG. 2 is a schematic hardware configuration diagram of the vehicle control apparatus according to Embodiment 1.

The vehicle control apparatus 50 is provided with functional units of a peripheral information acquisition unit 51, a road information acquisition unit 52, a merging vehicle determination unit 53, an interruption prediction unit 54, a vehicle control unit 55, and the like. Each function of the vehicle control apparatus 50 is realized by processing circuits provided in the vehicle control apparatus 50. As shown in FIG. 2, specifically, the vehicle control apparatus 50 is provided with an arithmetic processor 90 such as CPU (Central Processing Unit), storage apparatuses 91, an input and output circuit 92 which outputs and inputs external signals to the arithmetic 90, and the like.

As the arithmetic processor 90, ASIC (Application Specific Integrated Circuit), IC (Integrated Circuit), DSP (Digital Signal Processor), FPGA (Field Programmable Gate Array), GPU (Graphics Processing Unit), AI (Artificial Intelligence) chip, various kinds of logical circuits, various kinds of signal processing circuits, and the like may be provided. As the arithmetic processor 90, a plurality of the same type ones or the different type ones may be provided, and each processing may be shared and executed. As the storage apparatuses 91, various kinds of storage apparatus, such as RAM (Random Access Memory), ROM (Read Only Memory), a flash memory, EEPROM (Electrically Erasable Programmable Read Only Memory), and a hard disk, are used.

The input and output circuit 92 is provided with a communication device, an A/D converter, an input/output port, a driving circuit, and the like. The input and output circuit 92 is connected to the periphery monitoring apparatus 31, the position detection apparatus 32, the vehicle state detection apparatus 33, the map information database 34, the wireless communication apparatus 35, and the drive control apparatus 36, and communicates with these devices.

Then, the arithmetic processor 90 runs software items (programs) stored in the storage apparatus 91 and collaborates with other hardware devices in the vehicle control apparatus 50, such as the storage apparatus 91, and the input and output circuit 92, so that the respective functions of the functional units 51 to 55 provided in the vehicle control apparatus 50 are realized. Setting data, such as a weighting factor W, utilized in the functional units 51 to 55 are stored in the storage apparatus 91, such as EEPROM.

Figure 3:
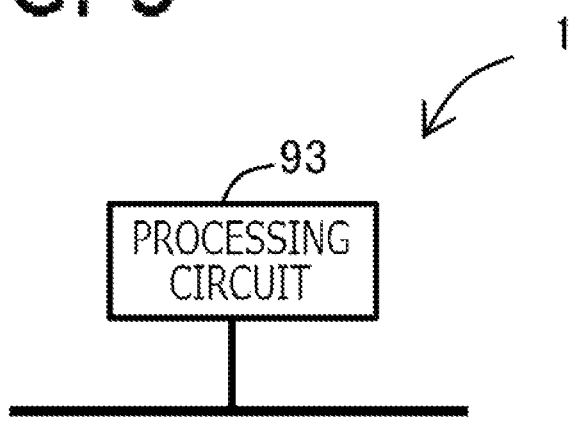
FIG. 3 is a schematic hardware configuration diagram of the vehicle control apparatus according to Embodiment 1.

Alternatively, as shown in FIG. 3, the vehicle control apparatus 50 may be provided with a dedicated hardware 93 as the processing circuit, for example, a single circuit, a combined circuit, a programmed processor, a parallel programmed processor, ASIC, FPGA, GPU, AI chip, or a circuit which combined these. Each function of the vehicle control apparatus 50 will be described in detail below.

1-1-1. Peripheral Information Acquisition Unit 51

The peripheral information acquisition unit 51 detects a peripheral vehicle and the like which exist around the ego vehicle. The peripheral information acquisition unit 51 detects a position, a traveling direction, a traveling speed, and the like of the peripheral vehicle, based on the detection information acquired from the periphery monitoring apparatus 31, and the position information of the ego vehicle acquired from the position detection apparatus 32. The peripheral information acquisition unit 51 detects an obstacle, a pedestrian, a sign, and the like other than the peripheral vehicle. The peripheral information acquisition unit 51 may acquire the information on the position, the traveling direction, the speed, and the acceleration of the peripheral vehicle from the peripheral vehicle by the wireless communication.

Figure 4:
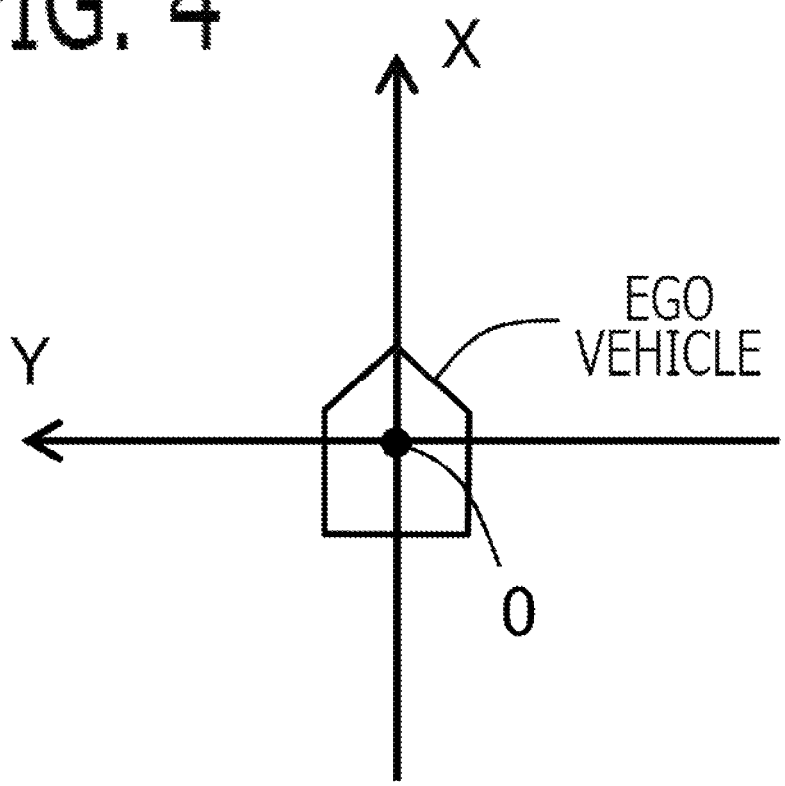
FIG. 4 is a figure for explaining the ego vehicle coordinate system according to Embodiment 1.

In the present embodiment, the peripheral information acquisition unit 51 detects a relative position and a relative speed of the peripheral vehicle and the like with respect to the ego vehicle in an ego vehicle coordinate system on the basis of the current position of the ego vehicle. As shown in FIG. 4, the ego vehicle coordinate system is a coordinate system which has two axes of a longitudinal direction X and a lateral direction Y of the current ego vehicle. The front side of the longitudinal direction X is positive side, and the back side is negative side. That is to say, the peripheral information acquisition unit 51 detects a relative position Xrdet and a relative speed Vxrdet of the peripheral vehicle with respect to the ego vehicle in the longitudinal direction X of the ego vehicle. The peripheral information acquisition unit 51 detects a relative acceleration $\alpha xrdet$ of the peripheral vehicle with respect to the ego vehicle in the longitudinal direction X of the ego vehicle, based on a time change rate of the relative speed Vxrdet of the peripheral vehicle.

1-1-2. Road Information Acquisition Unit 52

The road information acquisition unit 52 acquires the road information around the ego vehicle from the map information database 34, based on the position information on the ego vehicle acquired from the position detection apparatus 32. The acquired road information includes the lane number, the position of each lane, the shape of each lane, the type of each lane, the road type, the regulation speed, and the like. The type of each lane includes the merging lane which merges into the main lane, and the main lane into which the merging lane merges.

The road information acquisition unit 52 acquires the road information around the ego vehicle detected by the peripheral information acquisition unit 51. For example, the road information acquisition unit 52 detects a shape and a type of a lane marking of road, based on the detection information on the lane marking, such as a white line and a road shoulder, acquired from the periphery monitoring apparatus 31; and determines the shape and the position of each lane, the lane number, the type of each lane, and the like, based on the detected shape and the type of the lane marking of road. The type of each lane includes the merging lane and the main lane.

The road information acquisition unit 52 acquires lane information corresponding to a lane where the ego vehicle is traveling, based on the position of the ego vehicle. The road information acquisition unit 52 acquires lane information corresponding to a lane where each peripheral vehicle is traveling, based on the position of each peripheral vehicle. The acquired Lane information includes the shape, the position, and the type of the lane, and the lane information of peripheral lanes.

1-1-3. Vehicle Control Unit 55

The vehicle control unit 55 determines a target traveling trajectory in accordance with state of the peripheral vehicle detected by the peripheral information acquisition unit 51, the obstacle, and the pedestrian, and the road shape around the ego vehicle detected by the road information acquisition unit 52. The target traveling trajectory is a traveling plan of time series of the position of the ego vehicle, the traveling direction of the ego vehicle, the speed of the ego vehicle, the driving lane, the position where lane is changed, and the like at each future time. When one or both of a speed adjusting control and a lane change control of the ego vehicle are performed based on the interruption prediction result described below, the vehicle control unit 55 generates the target traveling trajectory for performing one or both of the speed adjusting control and the lane change control.

The vehicle control unit 55 controls the vehicle so as to follow the target traveling trajectory of the ego vehicle. For example, the vehicle control unit 55 decides a target speed, a target steering angle, an operation command of the direction indicator, and the like. Each decided command value is transmitted to the drive control apparatus 36, such as the power controller, the brake controller, the automatic steering controller, and the light controller.

The power controller controls the output of power machines 8, such as the internal combustion engine and the motor, so that the speed of the ego vehicle follows the target speed. The brake controller controls the brake operation of the electric brake apparatus so that the speed of the ego vehicle follows the target speed. The automatic steering controller controls the electric steering apparatus 7 so that the steering angle follows the target steering angle. The light controller controls the direction indicator according to the operation command of the direction indicator.

1-1-4. Merging Vehicle Determination Unit 53

The merging vehicle determination unit 53 determines whether or not the peripheral vehicle is a merging vehicle which merges into a lane where the ego vehicle is traveling, based on the lane information where the ego vehicle is traveling, and the lane information where the peripheral vehicle which exists around the ego vehicle is traveling. When the plurality of peripheral vehicles exist, it is determined about each peripheral vehicle.

Figure 5:
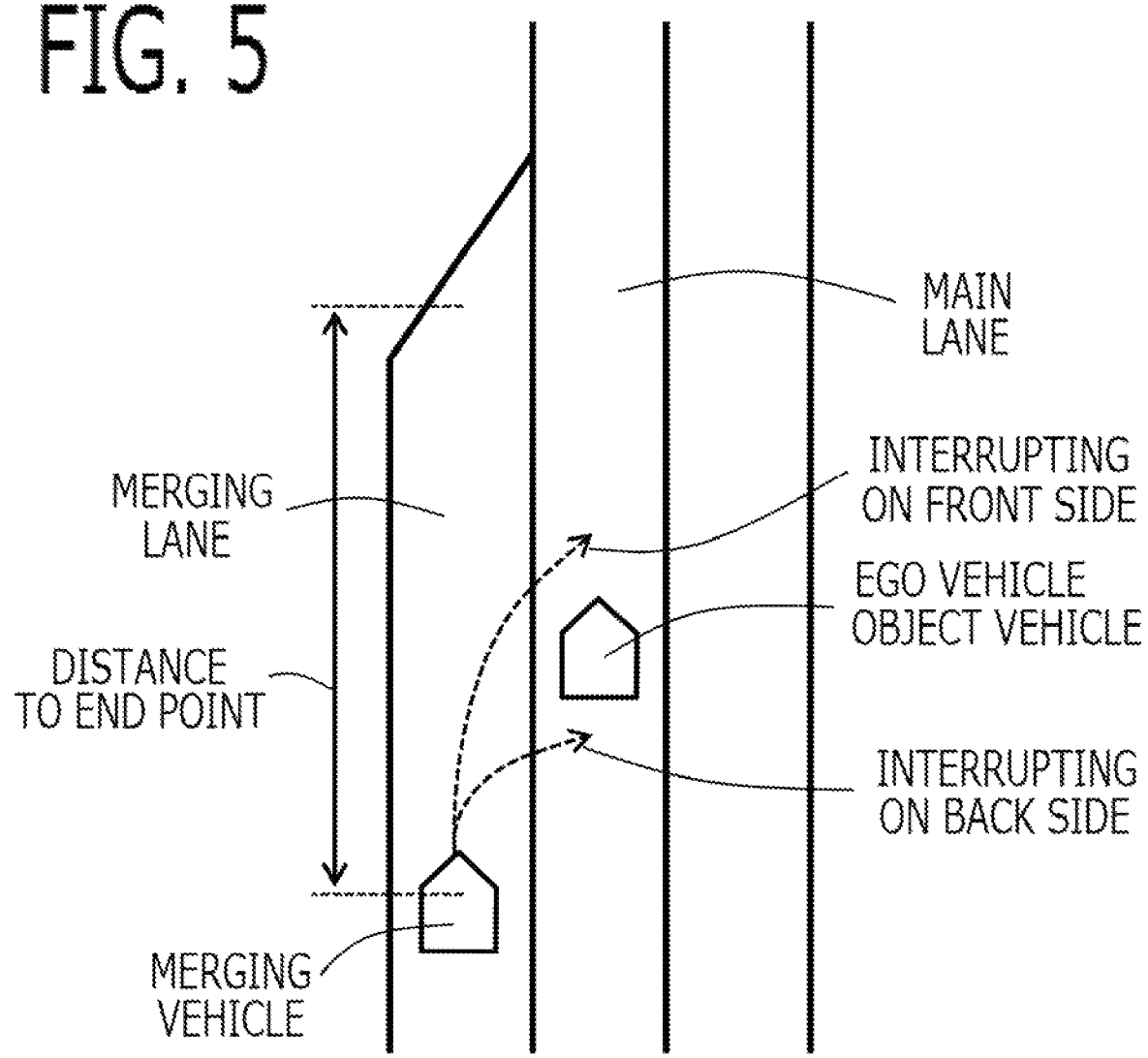
FIG. 5 is a schematic diagram for explaining the interruption prediction according to Embodiment 1.

As shown in FIG. 5, for example, when the type of the lane where the peripheral vehicle is traveling is the merging lane, and the lane where the ego vehicle is traveling is the main lane into which the merging lane where the peripheral vehicle is traveling merges, the merging vehicle determination unit 53 determines that the peripheral vehicle is the merging vehicle.

1-1-5. Interruption Prediction Unit 54

When the peripheral vehicle is the merging vehicle, it is required to predict whether the merging vehicle interrupts on the front side or the back side of the ego vehicle, for safe driving of the ego vehicle and the merging vehicle, and the like.

Figure 6:
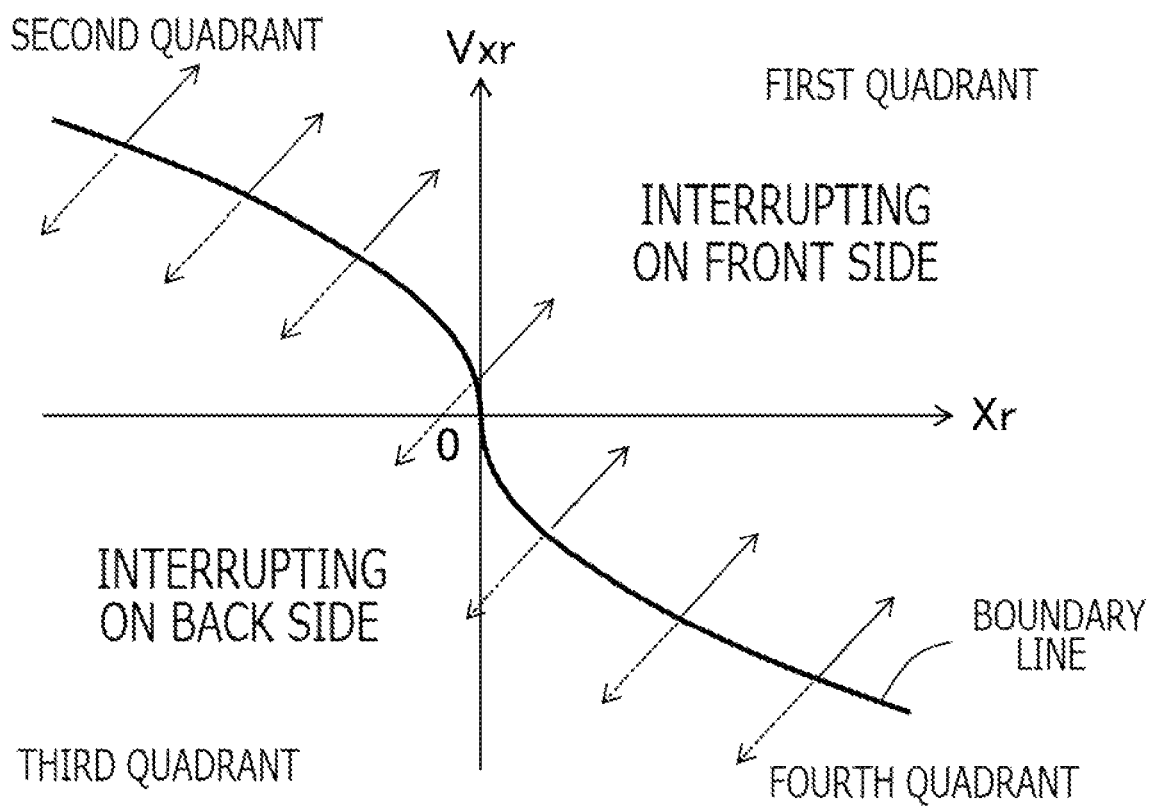
FIG. 6 is a schematic diagram for explaining the prediction using the boundary line according to Embodiment 1.

Derivation of Boundary Line by Assumption that Relative Acceleration is Constant In the following, a principle of interruption prediction will be explained. As shown in FIG. 6, in a two-dimensional coordinate system which has two axes of the relative position Xr and the relative speed Vxr of the merging vehicle with respect to the ego vehicle in the longitudinal direction X of the ego vehicle, a behavior of the merging vehicle is considered. Herein, the front side in the longitudinal direction X of the ego vehicle is defined as a positive side, and the back side is defined as a negative side.

A behavior of the merging vehicle which interrupts into the position of the ego vehicle which is neither the front side nor the back side of the ego vehicle, but the middle thereof is considered. This kind of the merging vehicle is called as the merging vehicle on the boundary line.

Two assumptions are set for the merging vehicle on the boundary line. As a first assumption, it is assumed that the merging vehicle accelerates or decelerates at a constant acceleration, in order to adjust with the speed of the ego vehicle which is traveling in the main lane, and the relative acceleration αxr of the merging vehicle with respect to the ego vehicle in the longitudinal direction X of the ego vehicle is constant. As a second assumption, it is assumed that the merging vehicle on the boundary line interrupts into the position of the ego vehicle, and when the merging is completed (Xr=0), the speed of the merging vehicle coincides with the speed of the ego vehicle, and the relative speed Vxr of the merging vehicle becomes 0.

The relative speed Vxr and the relative position Xr of the merging vehicle when t seconds elapse from the current time t0 can be expressed by the equation (1) and the equation (2).

$$Vxr = Vxr0 + \alpha xr0 \times t \quad (1)$$

$$Xr = Xr0 + Vxr0 \times t + \frac{1}{2} \alpha xr0 \times t^2$$

$$\alpha xr0 = \text{const.} \quad (2)$$

Herein, Vxr0 is the relative speed of the merging vehicle at the current time t0. αxr0 is the relative acceleration of the merging vehicle at the current time t0, and it is assumed that it is a constant value during the merging.

The equation (3) is obtained when the equation (1) is rearranged with regard to t. Then, when the equation (3) is substituted for the equation (2) and t is deleted, the equation (4) is obtained.

$$t = \frac{Vxr - Vxr0}{\alpha xr0} \quad (3)$$

$$Xr = Xr0 + Vxr0 \frac{Vxr - Vxr0}{\alpha xr0} + \frac{(Vxr - Vxr0)^2}{2\alpha xr0} \quad (4)$$

$$= \frac{1}{2\alpha xr0} Vxr^2 + \left(Xr0 - \frac{1}{2\alpha xr0} Vxr0^2\right)$$

Since the merging vehicle on the boundary line passes through Xr=0 and Vxr=0, when Xr=0 and Vxr=0 are substituted for the equation (4), the next equation is obtained. This equation becomes the boundary line where the merging vehicle on the boundary line passes.

$$Xr0 = \frac{1}{2\alpha xr0} Vxr0^2 \quad (5)$$

First Quadrant

In the first quadrant of Xr0 and Vxr>0, the merging vehicle is traveling in the front of the ego vehicle at a speed faster than the ego vehicle. Since the merging vehicle merges on the front side of the ego vehicle normally, the merging vehicle on the boundary line does not exist in the first quadrant, and the boundary line is not lined. In the first quadrant, since the merging vehicle merges while decelerating, it becomes αxr0<0. However, when αxr0<0 is set to the equation (5), it becomes Xr0<0, and the boundary line is not lined in the first quadrant.

Second Quadrant

In the second quadrant of Xr<0 and Vxr>0, the merging vehicle is traveling in the back of the ego vehicle at a speed faster than the ego vehicle. Since the merging vehicle merges on the front side of the ego vehicle when the relative speed Vxr0 of the merging vehicle is fast, and the merging vehicle merges on the back side of the ego vehicle when the relative speed Vxr0 of the merging vehicle is slow, the merging vehicle on the boundary line exists in the second quadrant, and the boundary line is lined. In the second quadrant, since the merging vehicle on the boundary line merges while decelerating, it becomes αxr0<0. When αxr0<0 is set to the equation (5), it becomes Xr0<0, and the boundary line is lined in the second quadrant. When the relative speed Vxr and the relative position Xr of the merging vehicle are located on the increase side with respect to the boundary line, it can be predicted that the merging vehicle interrupts on the front side of the ego vehicle. When the relative speed Vxr and the relative position Xr of the merging vehicle are located on the decrease side with respect to the boundary line, it can be predicted that the merging vehicle interrupts on the back side of the ego vehicle.

Third Quadrant

In the third quadrant of Xr<0 and Vxr<0, the merging vehicle is traveling in the back of the ego vehicle at a speed slower than the ego vehicle. Since the merging vehicle merges on the back side of the ego vehicle normally, the merging vehicle on the boundary line does not exist in the third quadrant, and the boundary line is not lined. In the third quadrant, since the merging vehicle merges while accelerating, it becomes αxr0>0. However, when αxr0>0 is set to the equation (5), it becomes Xr0>0, and the boundary line is not lined in the third quadrant.

Fourth Quadrant

In the fourth quadrant of Xr>0 and Vxr<0, the merging vehicle is traveling in the front of the ego vehicle at a speed slower than the ego vehicle. Since the merging vehicle merges on the front side of the ego vehicle when the relative speed Vxr0 of the merging vehicle is fast, and the merging vehicle merges on the back side of the ego vehicle when the relative speed Vxr0 of the merging vehicle is slow, the merging vehicle on the boundary line exists in the fourth quadrant, and the boundary line is lined. In the fourth quadrant, since the merging vehicle on the boundary line merges while accelerating, it becomes αxr0>0. When αxr0>0 is set to the equation (5), it becomes Xr0>0, and the boundary line is lined in the fourth quadrant. When the relative speed Vxr and the relative position Xr of the merging vehicle are located on the increase side with respect to the boundary line, it can be predicted that the merging vehicle interrupts on the front side of the ego vehicle. When the relative speed Vxr and the relative position Xr of the merging vehicle are located on the decrease side with respect to the boundary line, it can be predicted that the merging vehicle interrupts on the back side of the ego vehicle.

Boundary Line

As shown in the equation (6) which deformed the equation (5), since the merging vehicle merges while decelerating in the case of Vxr>0, it becomes αxr<0 and it becomes a coefficient 1/αxr<0. Since the merging vehicle merges while accelerating in the case of Vxr<0, it becomes αxr>0 and it becomes the coefficient 1/αxr>0. Therefore, the boundary line changes according to positive or negative of the relative speed Vxr of the merging vehicle.

$$Xr = \frac{1}{2\alpha xr} \times Vxr^2 \qquad (6)$$

1) In the case of $Vxr > 0$, $$\frac{1}{2\alpha xr} < 0$$

2) In the case of $Vxr < 0$, $$\frac{1}{2\alpha xr} > 0$$

As explained above, based on the relative position Xr and the relative speed Vxr of the merging vehicle, and the positive or negative of the relative speed of the merging vehicle, it can be predicted whether the merging vehicle interrupt on the front side or the back side of the ego vehicle.

Interruption Prediction

Then, when the peripheral vehicle is the merging vehicle, the interruption prediction unit 54 predicts whether the merging vehicle interrupts on the front side or the back side of the ego vehicle, based on the detection value of the relative position Xrdet of the merging vehicle, the detection value of the relative speed Vxrdet of the merging vehicle, and the positive or negative of the detection value of the relative speed Vxrdet of the merging vehicle.

According to this configuration, based on each detection value, it can be predicted whether the merging vehicle interrupts on the front side or the back side of the ego vehicle. At this time, since the positive or negative of detection value of the relative speed Vxrdet of the merging vehicle is considered, the case where the merging vehicle merges while decelerating and the case where the merging vehicle merges while accelerating, can be estimated separately, and estimation accuracy can be improved.

In the present embodiment, the interruption prediction unit 54 sets the boundary line in the two-dimensional coordinate system which has two axes of the relative position Xr and the relative speed Vxr of the merging vehicle with respect to the ego vehicle in the longitudinal direction X of the ego vehicle. And, the interruption prediction unit 54 predicts whether the merging vehicle interrupts on the front side or the back side of the ego vehicle, based on a relative position relation of the detection value of the relative position Xrdet of the merging vehicle and the detection value of the relative speed Vxrdet of the merging vehicle, with respect to the boundary line.

By a simple processing which determines the relative position relation of the detection value of the relative position Xrdet and the detection value of the relative speed Vxrdet of the merging vehicle with respect to the boundary line in the two-dimensional coordinate system, the interruption on the front side or the back side can be estimated with good accuracy.

As shown in the equation (7) which deformed the equation (6), the interruption prediction unit 54 sets, as the boundary line, a curved line that a value obtained by multiplying a negative weighting factor W to a square value of the relative speed Vxr of the merging vehicle becomes the relative position Xr of the merging vehicle, when the relative speed Vxr of the merging vehicle is a positive value, and that a value obtained by multiplying a positive weighting factor (W) to a square value of the relative speed Vxr of the merging vehicle becomes the relative position Xr of the merging vehicle, when the relative speed Vxr of the merging vehicle is a negative value. Herein, the weighting factor W is set to a positive value. sgn(Vxr) is signum, outputs 1 when Vxr is positive, and outputs −1 when Vxr is negative.

$$Xr = -sgn(Vxr) \times W \times Vxr \qquad (7)$$

$$W > 0$$

1) In tie case of Vxr >0, $$sgn(Vxr) = -1$$

2) In tie case of Vxr <0, $$sgn(Vxr) = -1$$

When the detection value of the relative position Xrdet and the detection value of the relative speed Vxrdet of the merging vehicle are located on the increase side of the relative position Xr and the relative speed Vxr with respect to the boundary line, the interruption prediction unit 54 predicts that the merging vehicle interrupts on the front side of the ego vehicle. When the detection value of the relative position Xrdet and the detection value of the relative speed Vxrdet of the merging vehicle are located on the decrease side of the relative position Xr and the relative speed Vxr with respect to the boundary line, the interruption prediction unit 54 predicts that the merging vehicle interrupts on the back side of the ego vehicle.

For example, the interruption prediction unit 54 predicts that the merging vehicle interrupts on the front side of the ego vehicle, when the equation (8) is satisfied; and predicts that the merging vehicle interrupts on the back side of the ego vehicle, when the equation (9) is satisfied.

$$Xrdet+sgn(Vxr) \times W \times Vxr^2 > 0 \quad (8)$$

$$Xrdet+sgn(Vxr) \times W \times Vxr^2 < 0 \quad (9)$$

Using the boundary line derived by assuming that the relative acceleration $\alpha xr$ of the merging vehicle is constant, and passes through the origin, by a simple processing which determines whether the merging vehicle locates on the increase side or the decrease side with respect to the boundary line, the interruption on the front side or the back side can be estimated with good accuracy.

The interruption prediction unit 54 may set the boundary line that the relative position Xr decrease from 0 as the relative speed Vxr increases from 0, and may set the boundary line that the relative position Xr increase from 0 as the relative speed Vxr decreases from 0. Even if the boundary line is shifted from the secondary equation of the equation (7) to some extent, but if it has a similar tendency, the interruption prediction can be performed. The boundary line may be a function of the relative position Xr and the relative speed Vxr, for example, a map data, a polynomial, and the like are used.

Change of Weighting Factor

As shown in the equation (5) and the equation (6), the weighting factor W changes in inverse proportion to the relative acceleration $\alpha xr$ of the merging vehicle. The relative acceleration $\alpha xr$ of the merging vehicle change according to the feature of the merging lane and the main lane.

Then, the interruption prediction unit 54 changes the weighting factor W, based on the feature of the merging lane where the merging vehicle is traveling and the main lane where the ego vehicle is traveling. According to this configuration, the setting accuracy of the weighting factor W can be improved, and the accuracy of interruption estimation can be improved.

As the feature of the merging lane and the main lane which affect the relative acceleration $\alpha xr$ of the merging vehicle, there are a speed difference between a speed at the starting point of the merging lane and a speed of the main lane, a distance of a section of the merging lane for performing the acceleration or deceleration, and the like.

As an absolute value of the speed difference between the vehicle speed at the starting point of the merging lane and the vehicle speed of the main lane becomes large, an absolute value of the relative acceleration $\alpha xr$ of the merging vehicle becomes large. As the distance of the section of the merging lane for performing the acceleration or deceleration becomes short, the absolute value of the relative acceleration $\alpha xr$ of the merging vehicle becomes large even if the speed difference between the starting point of the merging lane and the main lane are the same.

For example, when the starting point of the merging lane is connected to a tollgate of highway, and the main lane is a lane of highway, the vehicle speed of the main lane becomes higher than the vehicle speed at the starting point of the merging lane, and the absolute value of the relative acceleration $\alpha xr$ of the merging vehicle in the merging lane becomes large. Accordingly, the weighting factor W is required to be small. When the starting point of the merging lane is the lane of highway, and the main lane is the lane of highway, the speed difference between the vehicle speed at the starting point of the merging lane and the vehicle speed of the main lane becomes small, and the absolute value of the relative acceleration $\alpha xr$ of the merging vehicle in the merging lane becomes small. Accordingly, the weighting factor W is require to be large. When the starting point of the merging lane is the lane of highway, and the main lane is a lane of ordinary road, the vehicle speed of the main lane becomes smaller than the vehicle speed at the starting point of the merging lane, and the absolute value of the relative acceleration $\alpha xr$ of the merging vehicle in the merging lane becomes large. Accordingly, the weighting factor W is required to be small.

Therefore, as the feature of the merging lane and the main lane, information which influences a type of the starting point of the merging lane (for example, the tollgate, the highway, the ordinary road, and other lane types), a lane type of the main lane (for example, the highway, the ordinary road, other lane types), and a distance of the acceleration or deceleration section of the merging lane may be set.

For example, by referring to a weighting factor data table in which a relation between the type of the starting point of the merging lane, the lane type of the main lane, the distance of the acceleration or deceleration section of the merging lane, and the weighting factor W are preliminarily set, the interruption prediction unit 54 may read the weighting factor W corresponding to the type of the starting point of the current merging lane, the lane type of the current main lane, and the distance of the acceleration or deceleration section of the current merging lane. The weighting factor data table is stored in EEPROM and the like. The interruption prediction unit 54 determines these current information, based on the lane information where the ego vehicle is traveling, and the lane information where the merging vehicle is traveling.

Alternatively, the weighting factor W is preliminarily set for each of the merging lane registered in the map information database 34, and the interruption prediction unit 54 may read the weighting factor W of the corresponding merging lane from the map information database 34. Although the weighting factor W of each merging lane is required to be set, the weighting factor W suitable for the condition of each merging lane can be set.

Even in the same merging lane, the relative acceleration $\alpha xr$ of the merging vehicle changes according to the driving and the performance of the merging vehicle, the traffic situation, and the like. The interruption prediction unit 54 may change the weighting factor W, based on the detection value of the relative acceleration $\alpha xrdet$ of the merging vehicle.

For example, the interruption prediction unit 54 may correct the weighting factor W which was set based on the feature of the merging lane and the main lane, based on the detection value of the relative acceleration $\alpha xrdet$ of the merging vehicle. In this case, a standard relative acceleration αxrave of the merging vehicle is stored previously together with the weighting factor W, for every feature of the merging lane and the main lane. The interruption prediction unit 54 may calculate a correction value by dividing the standard relative acceleration αxrave corresponding to the feature of the current merging lane and the current main lane, by the detection value of the relative acceleration αxrdet of the merging vehicle; and may multiply the correction value to the weighting factor W corresponding to the feature of the current merging lane and the current main lane.

Alternatively, the interruption prediction unit 54 may change the weighting factor W, based on the detection value of the relative acceleration αxrdet of the merging vehicle. As shown in the equation (4) and the equation (5), since the weighting factor W is in inverse proportion to the relative acceleration αxr of the merging vehicle, as an absolute value of the detection value of the relative acceleration αxrdet of the merging vehicle increases, an absolute value of the weighting factor W is decreased.

As the merging vehicle approaches the end of the merging lane, a probability that the merging vehicle merges into the main lane becomes high while keeping the front and back positional relation between the current merging vehicle and the ego vehicle, regardless of a magnitude of the detection value of the relative speed Vxrdet of the merging vehicle. Accordingly, whether the detection value of the relative position Xrdet of the merging vehicle is larger than 0 or smaller than 0 becomes dominant in the interruption estimation of the front side or the back side.

Figure 7:
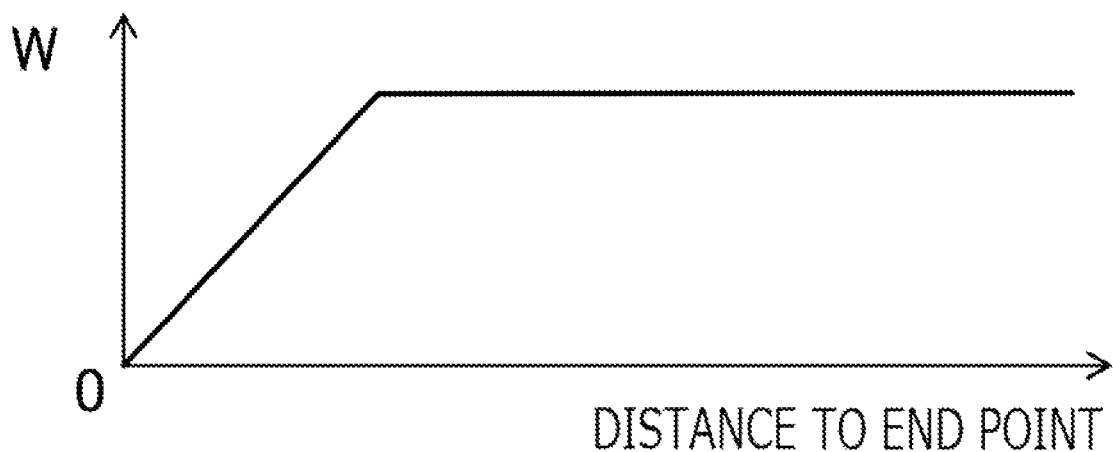
FIG. 7 is a figure for explaining setting of the weighting factor according to the distance to the end point according to Embodiment 1.
Figure 8:
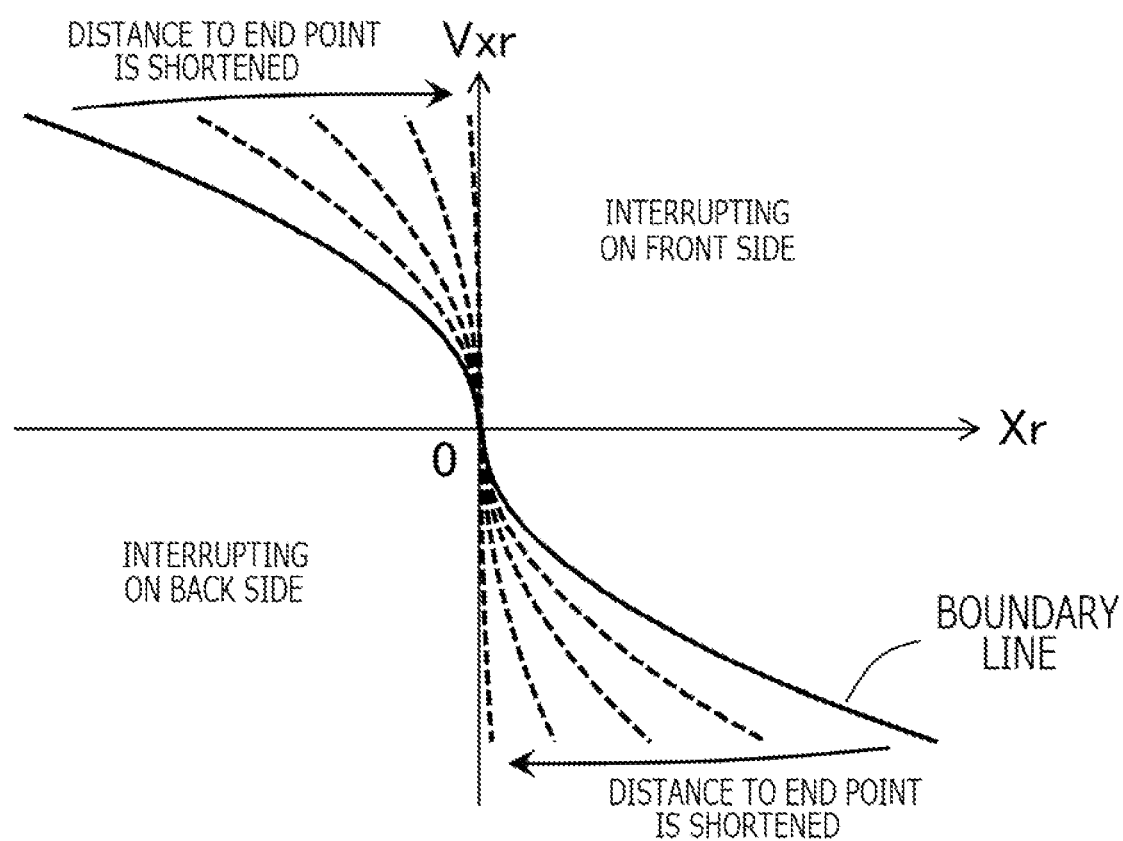
FIG. 8 is a figure for explaining setting of the weighting factor according to the distance to the end point according to Embodiment 1.

Then, as shown in FIG. 7 and FIG. 8, as a distance or a required time from the position of the current merging vehicle to the end of the merging lane becomes short, the interruption prediction unit 54 may decrease the absolute value of the weighting factor W.

According to this configuration, as the distance or the required time to the end of the merging lane becomes short, the boundary line is brought close to the axis of the relative speed Vxr, and whether the detection value of the relative position Xrdet of the merging vehicle is larger than 0 or smaller than 0 can be made dominant in the interruption estimation of the front side or the back side. The prediction accuracy can be improved.

For example, the interruption prediction unit 54 may correct the weighting factor W which was set based on the feature of the merging lane and the main lane, and the like, based on the distance or the required time to the end of the merging lane. In this case, the interruption prediction unit 54 calculates a correction coefficient, based on the distance or the required time to the end of the merging lane; and may multiply the correction coefficient to the weighting factor W which was set based on the feature of the merging lane and the main lane, and the like. As the distance or the required time to the end of the merging lane becomes short, the correction coefficient is brought close to 0 from 1. For example, the required time to the end of the merging lane is calculated by dividing the distance to the end of the merging lane by the speed of the merging vehicle.

Calculation of Interruption Probability According to Distance from Boundary Line As a distance D between the boundary line, and the detection value of the relative position Xrdet of the merging vehicle and the detection value of the relative speed Vxrdet of the merging vehicle becomes long, the interruption prediction unit 54 increases the interruption probability of the side predicted among the front side and the back side.

As the merging vehicle goes away from the boundary line, the interruption probability of the side predicted among the front side and the back side increases. According to the above configuration, by the simple processing which calculates the distance D between the boundary line and the merging vehicle, the interruption probability of the front side or the back side can be evaluated.

Figure 9:
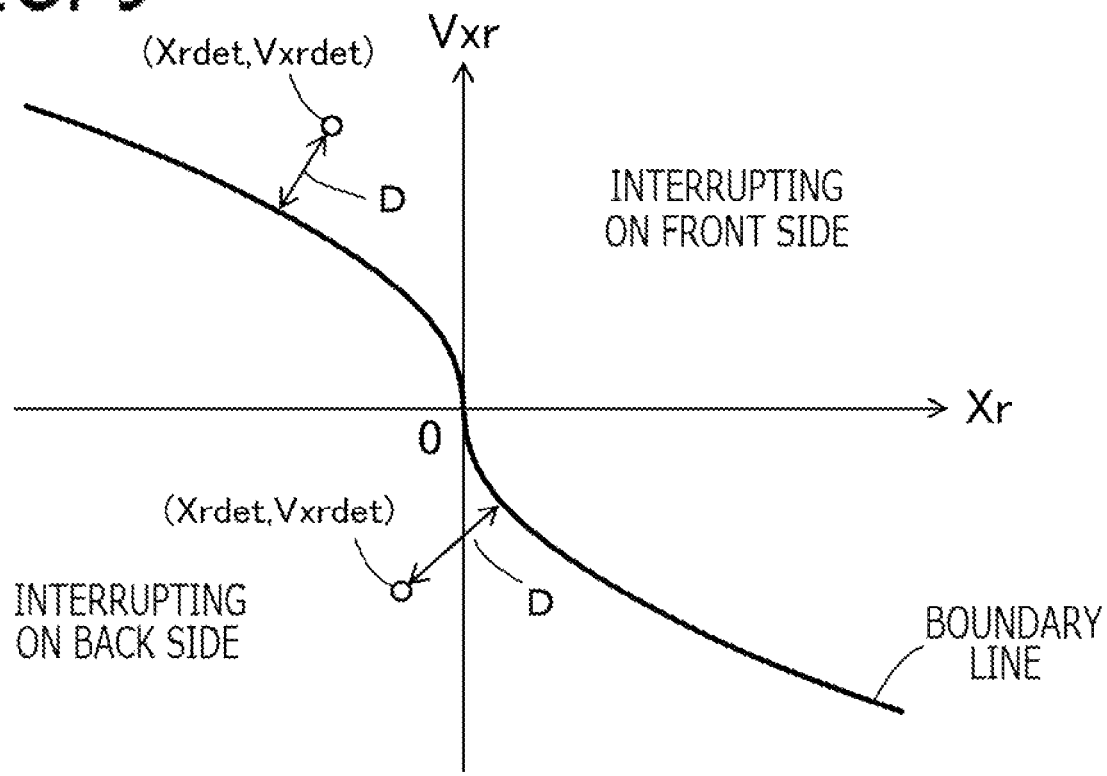
FIG. 9 is a figure for explaining calculation of the distance between the boundary line and the merging vehicle according to Embodiment 1.
Figure 13:
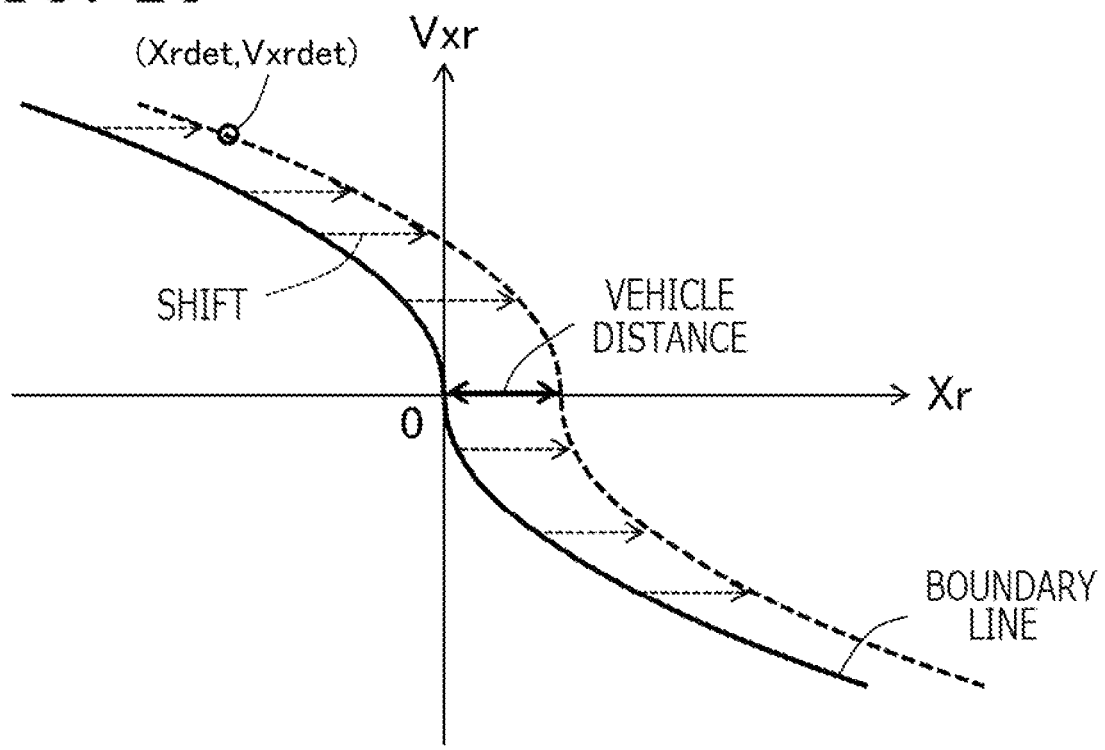
FIG. 13 is a figure for explaining calculation of the vehicle distance at the completion of merging according to Embodiment 1.

For example, as shown in FIG. 9, the interruption prediction unit 54 calculates the shortest distance D between the boundary line, and the detection value of the relative position Xrdet of the merging vehicle and the detection value of the relative speed Vxrdet of the merging vehicle. The shortest distance D is calculated from the geometric relation of the boundary line. Alternatively, the distance D in the direction of the relative position Xr between the boundary line, and the detection value of the relative position Xrdet of the merging vehicle and the detection value of the relative speed Vxrdet of the merging vehicle may be calculated. As shown in FIG. 13 described below, the distance D in the direction of the relative position Xr corresponds to the vehicle distance between the ego vehicle and the merging vehicle at the completion of merging.

Then, using a function in which a relation between the distance D and the interruption probability is preliminarily set, the interruption prediction unit 54 calculates the interruption probability corresponding to the calculated distance D. As the distance D becomes long, the interruption probability of the side predicted among the front side and the back side is increased, and the interruption probability of the side not predicted among the front side and the back side is decreased.

Figure 10:
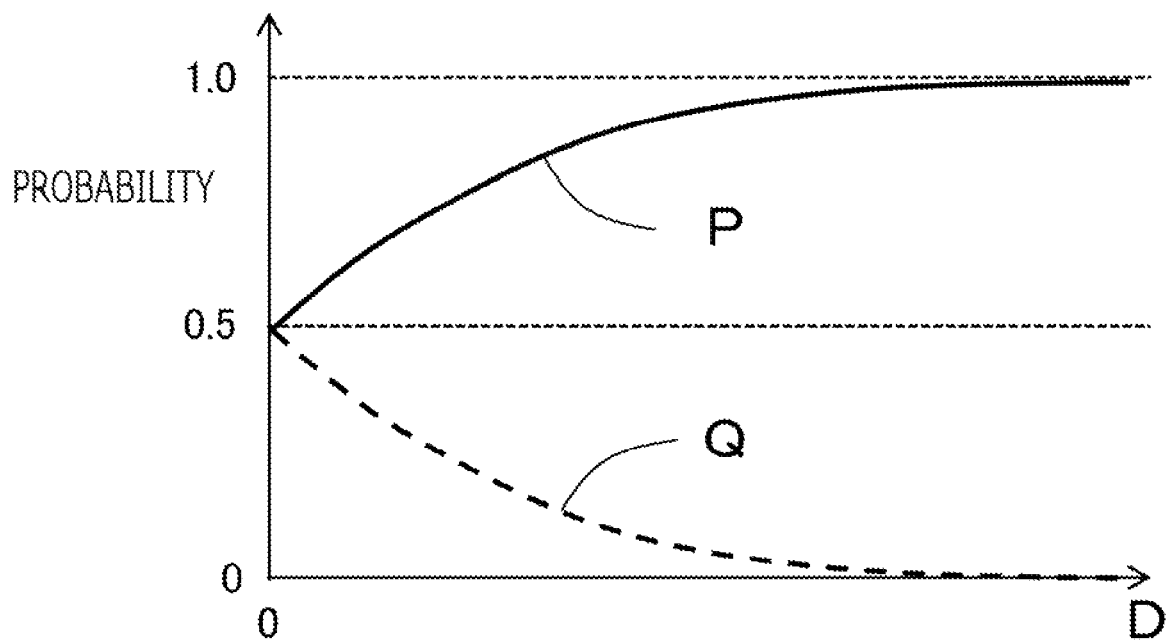
FIG. 10 is a figure for explaining calculation of the interruption probability according to Embodiment 1.

For example, using the equation (10), the interruption prediction unit 54 calculates the interruption probability P of the side predicted among the front side and the back side (referred to also as the interruption probability P of the predicted side), based on the distance D. As shown in FIG. 10, as the distance D increases from 0, the interruption probability P of the predicted side increases gradually from 0.5 to 1. The interruption probability Q of the side not predicted among the front side and the back side (referred to also as the interruption probability Q of the non-predicted side) becomes a value obtained by subtracting the interruption probability P of the predicted side from 1. When predicted as the interruption on the front side, the interruption probability P of the predicted side becomes the interruption probability of the front side. When predicted as the interruption on the back side, the interruption probability P of the predicted side becomes the interruption probability of the back side.

$$P = \frac{1}{1 + e^{-D}} \qquad (10)$$
$$Q = 1 - P$$

Control of Vehicle Distance at Completion of Merging

The vehicle control unit 55 performs one or both of a speed adjusting control and a lane change control of the ego vehicle so that a vehicle distance between the merging vehicle after interruption and the ego vehicle is secured, based on the interruption prediction result of the front side or the back side by the interruption prediction unit 54.

For example, the vehicle control unit 55 may perform one or both of the speed adjusting control and the lane change control of the ego vehicle, based on the interruption probability P of the predicted side. As the interruption probability P of the predicted side becomes close to a probability corresponding to the boundary line (0.5 in the equation (10)), the vehicle distance between the merging vehicle after interruption and the ego vehicle becomes short, the necessity of performing the speed adjusting control and the lane change control becomes high. On the other hand, when the interruption probability P of the predicted side is distant from the probability corresponding to the boundary line, since the vehicle distance after merging becomes long, the necessity of performing the speed adjusting control and the lane change control becomes low.

Figure 11:
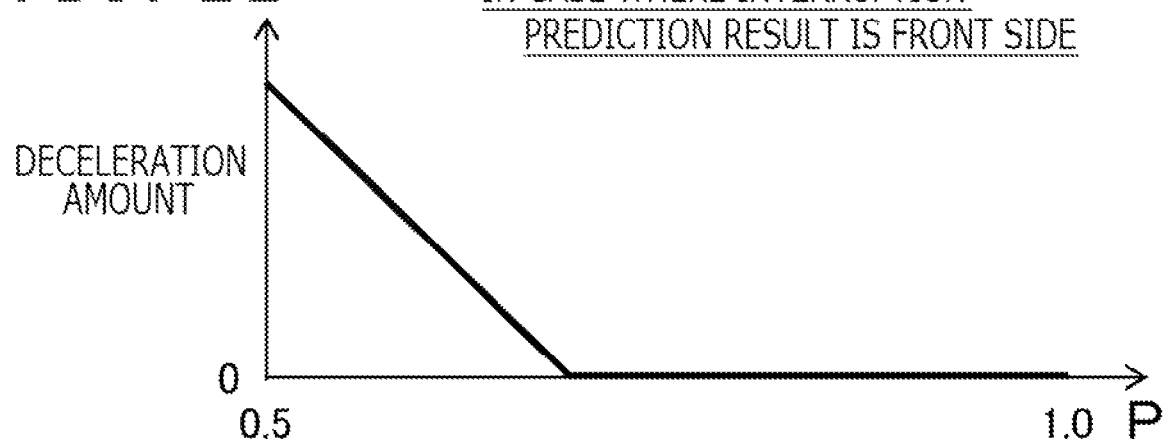
FIG. 11 is a figure for explaining calculation of the deceleration amount according to the interruption probability of the front side according to Embodiment 1.
Figure 12:
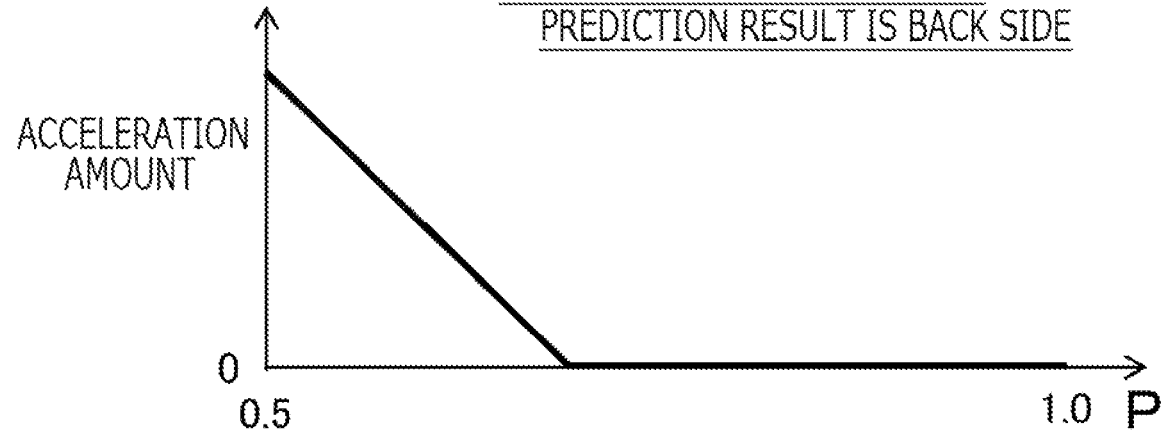
FIG. 12 is a figure for explaining the calculation of the acceleration amount according to the interruption probability of the back side according to Embodiment 1.

Accordingly, as the interruption probability P of the predicted side becomes close to the probability corresponding to the boundary line, the vehicle control unit 55 increases an amount of acceleration or deceleration of the ego vehicle. For example, in the case of the interruption prediction result of the front side, as shown in FIG. 11, as the interruption probability P of the predicted side becomes close to the probability (in this example, 0.5) corresponding to a boundary line, the deceleration amount of the ego vehicle is increased. On the other hand, in the case of the interruption prediction result of the back side, as shown in FIG. 12, as the interruption probability P of the predicted side becomes close to the probability (0.5) corresponding to the boundary line, the acceleration amount of the ego vehicle is increased. When the interruption probability P of the predicted side becomes larger than the probability corresponding to the boundary line by a predetermined value, the acceleration amount or the deceleration amount is set to 0, and acceleration or deceleration is not performed.

The vehicle control unit 55 sets a value obtained by adding or subtracting the acceleration amount or the deceleration amount from the current speed or the target speed of the ego vehicle, as the target speed; and changes one or both of the output of the power machine 8, and the braking force of the brake so that the speed of the ego vehicle follows the target speed.

When the interruption probability P of the predicted side becomes closer to the probability corresponding to the boundary line than a predetermined value (for example, the probability P is less than or equal to a lane change determination value), and the ego vehicle can change lane to the adjacent lane of the ego vehicle, the vehicle control unit 55 may change lane to the adjacent lane. The vehicle control unit 55 controls the electric steering apparatus 7 and controls the direction indicator so as to change lane to the adjacent lane.

Alternatively, the interruption prediction unit 54 predicts a vehicle distance between the ego vehicle and the merging vehicle at the completion of merging; and may perform one or both of the speed adjusting control and the lane change control of the ego vehicle, based on the predicted vehicle distance. For example, the interruption prediction unit 54 predicts the vehicle distance at the completion of merging, based on the boundary line, and the detection value of the relative position Xrdet and the detection value of the relative speed Vxrdet of the merging vehicle.

For example, as shown in FIG. 13, the interruption prediction unit 54 shifts the boundary line in the direction of the relative position Xr so that the boundary line passes through the detection value of the relative position Xrdet and the detection value of the relative speed Vxrdet of the merging vehicle; and calculates the relative position Xr of the boundary line after shift at the relative speed Vxr=0, as the vehicle distance. Similarly to the boundary line, this is a vehicle distance predicted by assuming that the relative acceleration of the merging vehicle is constant.

Alternatively, using the equation (4), the interruption prediction unit 54 may calculate the relative position Xr in the case of relative speed Vxr=0, as the vehicle distance, based on the detection value of the relative position Xrdet, the detection value of the relative speed Vxrdet, and the detection value of the relative acceleration αxrdet of the merging vehicle. Xrdet is substituted for Xr0 of the equation (4), Vxrdet is substituted for Vxr0 of the equation (4), and αxrdet is substituted for αxr0 of the equation (4).

Similarly to the interruption probability P of the predicted side, the vehicle control unit 55 may perform one or both of the speed adjusting control and the lane change control of the ego vehicle, based on the vehicle distance. The vehicle control unit 55 increases the amount of acceleration or deceleration of the ego vehicle, as the vehicle distance becomes short. For example, in the case of the interruption prediction result of the front side, as the vehicle distance becomes short, the deceleration amount of the ego vehicle is increased. On the other hand, in the case of the interruption prediction result of the back side, as the vehicle distance becomes short, the acceleration amount of the ego vehicle is increased. When the vehicle distance becomes larger than a predetermined value, the acceleration amount or the deceleration amount is set to 0, acceleration or deceleration is not performed.

When the vehicle distance becomes smaller than the predetermined value and the ego vehicle can change lane to the adjacent lane, the vehicle control unit 55 may change lane to the adjacent lane.

Flowchart

Figure 14:
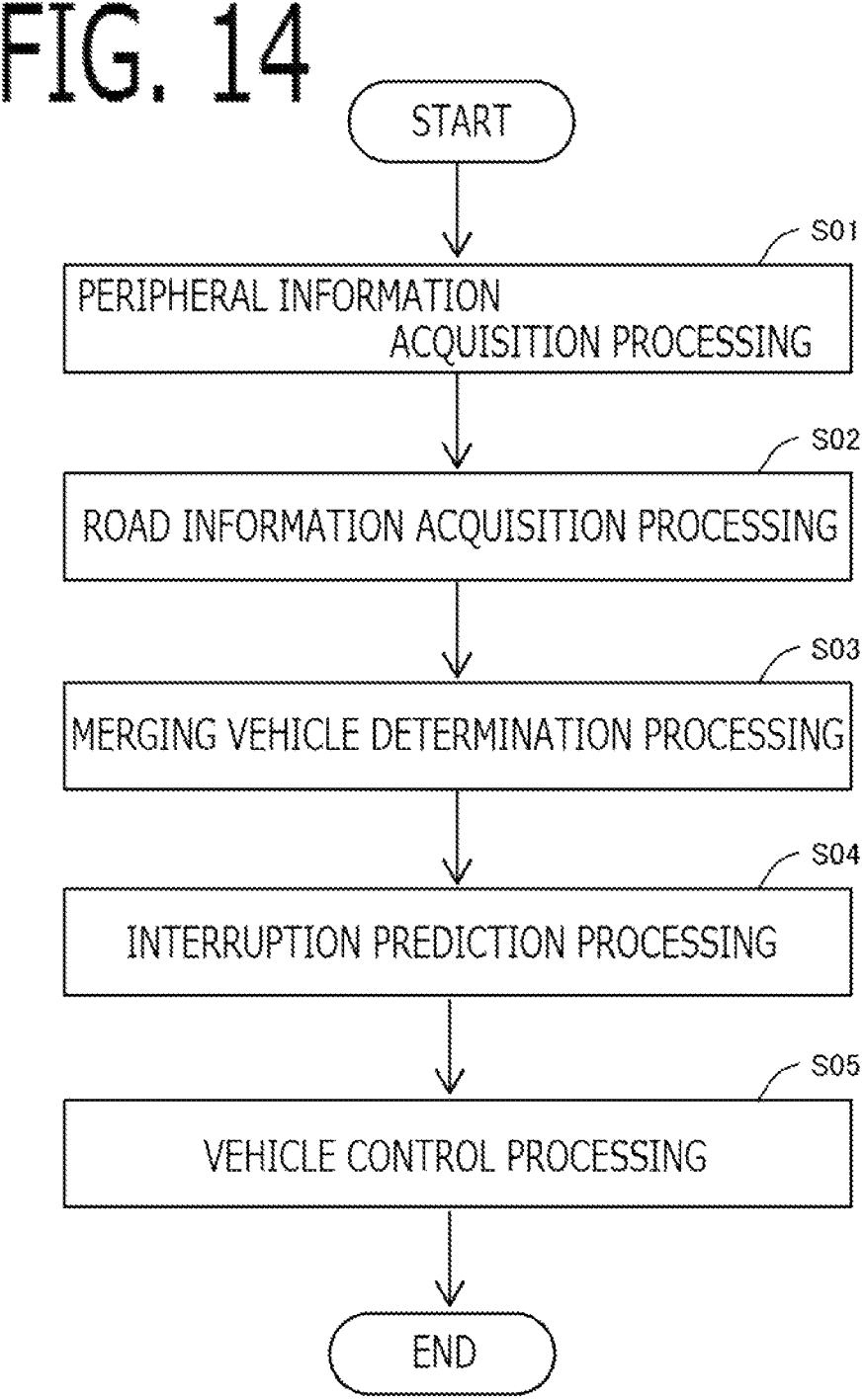
FIG. 14 is a flowchart explaining processing of the lane change prediction system according to Embodiment 1.

FIG. 14 is a flowchart explaining processing of the lane change prediction system 1 according to the present embodiment. Processing of FIG. 14 is executed at every predetermined calculation period, for example.

In the step S01, as mentioned above, the peripheral information acquisition unit 51 detects the peripheral vehicle which exists around the ego vehicle (object vehicle), and detects the relative position Xrdet and the relative speed Vxrdet of the peripheral vehicle with respect to the ego vehicle in the longitudinal direction X of the ego vehicle.

In the step S02, as mentioned above, the road information acquisition unit 52 acquires the lane information where the ego vehicle (object vehicle) is traveling, and the lane information where the peripheral vehicle is traveling.

In the step S03, as mentioned above, the merging vehicle determination unit 53 determines whether or not the peripheral vehicle is a merging vehicle which merges into a lane where the ego vehicle is traveling, based on the lane information where the ego vehicle is traveling, and the lane information where the peripheral vehicle is traveling.

In the step S04, as mentioned above, when the peripheral vehicle is the merging vehicle, the interruption prediction unit 54 predicts whether the merging vehicle interrupts on the front side or the back side of the ego vehicle, based on the detection value of the relative position Xrdet of the merging vehicle, the detection value of the relative speed Vxrdet of the merging vehicle, and the positive or negative of the detection value of the relative speed Vxrdet of the merging vehicle. In the present embodiment, the interruption prediction unit 54 sets the boundary line in the two-dimensional coordinate system which has two axes of the relative position Xr and the relative speed Vxr of the merging vehicle with respect to the ego vehicle in the longitudinal direction X of the ego vehicle. And the interruption prediction unit 54 predicts whether the merging vehicle interrupts on the front side or the back side of the ego vehicle, based on a relative position relation of the detection value of the relative position Xrdet of the merging vehicle and the detection value of the relative speed Vxrdet of the merging vehicle, with respect to the boundary line. Since details of each prediction processing are as mentioned above, explanation is omitted.

In the step S05, as mentioned above, the vehicle control unit 55 performs one or both of a speed adjusting control and a lane change control of the ego vehicle so that a vehicle distance between the merging vehicle after interruption and the ego vehicle is secured, based on the interruption prediction result of the front side or the back side by the interruption prediction unit 54.

2. Embodiment 2

Next, the lane change prediction system 1 and the vehicle control apparatus 50 according to Embodiment 2 will be explained. The explanation for constituent parts the same as those in Embodiment 1 will be omitted. The basic configuration of the lane change prediction system 1 and the vehicle control apparatus 50 according to the present embodiment is the same as that of Embodiment 1. Embodiment 2 is different from Embodiment 1 in that the peripheral vehicle located in front or back of the ego vehicle is considered.

In the present embodiment, the interruption prediction unit 54 calculates a collision danger degree between the merging vehicle and a front or back vehicle located in front or back of the ego vehicle, and determines a maximum front or back vehicle which is the front or back vehicle whose collision danger degree becomes the maximum. Then, the interruption prediction unit 54 decreases an interruption probability of the front side and increases an interruption probability of the back side, when the maximum front or back vehicle is located on the front side of the ego vehicle. And, the interruption prediction unit 54 decreases the interruption probability of the back side and increases the interruption probability of the front side, when the maximum front or back vehicle is located on the back side of the ego vehicle.

It is predicted that the merging vehicle merges into the main lane so as to avoid the maximum front or back vehicle whose collision danger degree becomes the maximum. When the maximum front or back vehicle is located on the front side of the ego vehicle, the interruption probability of the front side is decreased, and the interruption probability of the back side is increased. When the maximum front or back vehicle is located on the back side of the ego vehicle, the interruption probability of the back side is decreased, and the interruption probability of the front side is increased. As a result, considering the front or back vehicle of the ego vehicle, the estimation accuracy of interruption can be improved.

Figure 15:
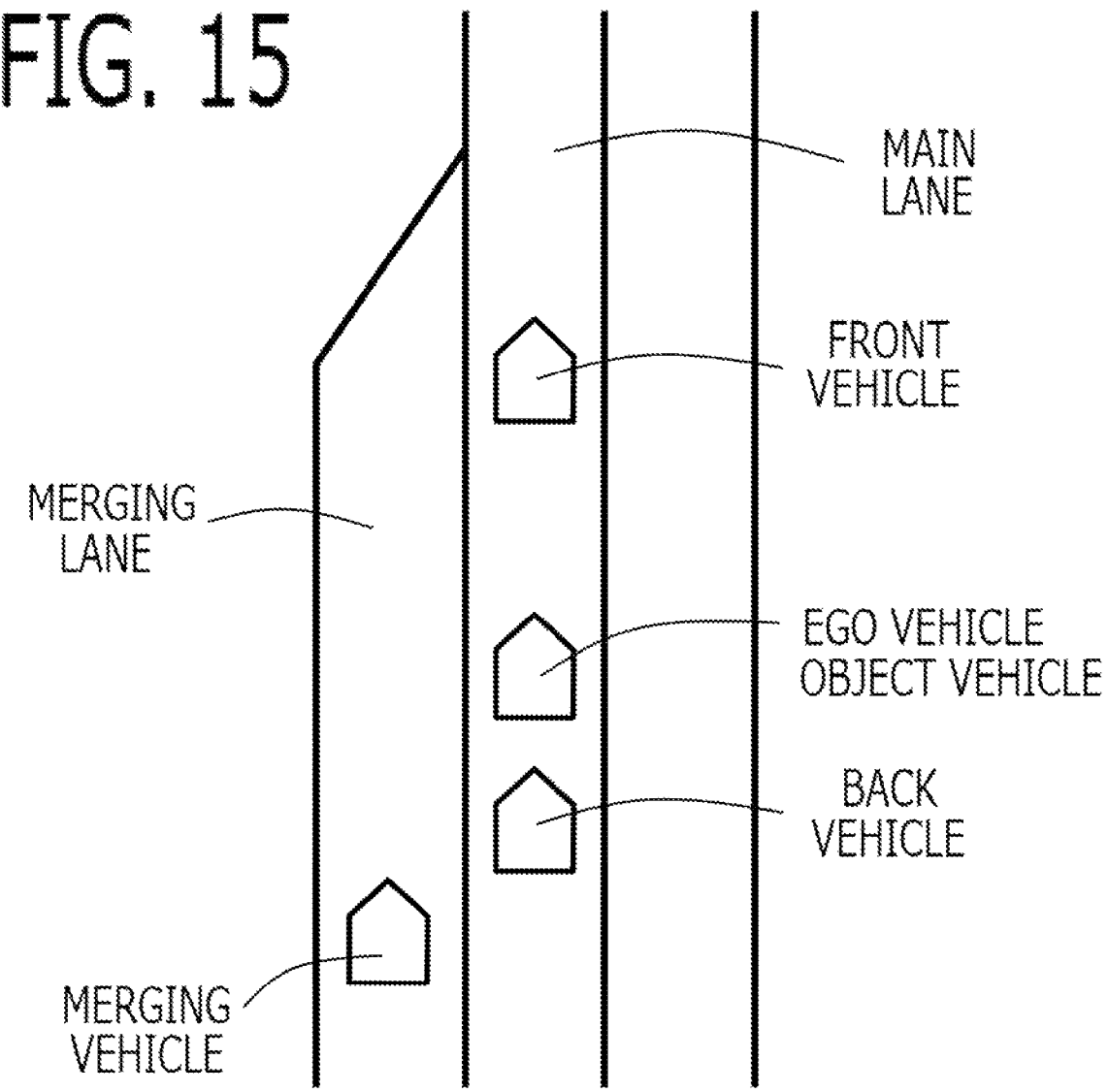
FIG. 15 is a schematic diagram for explaining the interruption prediction according to Embodiment 2.

As shown in FIG. 15, for example, the interruption prediction unit 54 determines the front vehicle located on the front side of the ego vehicle, and the back vehicle located on the back side of the ego vehicle, among the peripheral vehicles. Then, about each of the front vehicle and the back vehicle, the interruption prediction unit 54 detects a relative position and a relative speed of the merging vehicle with respect to the front or back vehicle in the longitudinal direction X of the ego vehicle. For example, the interruption prediction unit 54 calculates a detection value of the relative position of the merging vehicle with respect to the front or back vehicle, by subtracting the detection value of the relative position of the front or back vehicle with respect to the ego vehicle, from the detection value of the relative position of the merging vehicle with respect to the ego vehicle; and calculates a detection value of the relative speed of the merging vehicle with respect to the front or back vehicle, by subtracting the detection value of the relative speed of the front or back vehicle with respect to the ego vehicle, from the detection value of the relative speed of the merging vehicle with respect to the ego vehicle.

Then, about each of the front vehicle and the back vehicle, the interruption prediction unit 54 calculates a time to collision (TTC) of the merging vehicle with respect to the front or back vehicle, based on the detection value of the relative position and the detection value of the relative speed of the merging vehicle with respect to the front or back vehicle. For example, the interruption prediction unit 54 calculates the time to collision by dividing the detection value of the relative position of the merging vehicle with respect to the front or back vehicle, by the detection value of the relative speed of the merging vehicle with respect to the front or back vehicle. As the time to collision becomes small, the collision danger degree becomes high. Then, the interruption prediction unit 54 determines that either smaller one of the time to collision of the front vehicle or the time to collision of the back vehicle corresponds to the maximum front or back vehicle. In calculation of the time to collision, the detection value of the relative acceleration of the merging vehicle with respect to the front or back vehicle may be considered. The detection value of the relative acceleration of the merging vehicle with respect to the front or back vehicle is calculated by subtracting the detection value of the relative acceleration of the front or back vehicle with respect to the ego vehicle, from the detection value of the relative acceleration of the merging vehicle with respect to the ego vehicle.

Similarly to Embodiment 1, the interruption prediction unit 54 calculates the interruption probability of the front side and the interruption probability of the back side, based on the distance D between the boundary line, and the detection value of the relative position Xrdet of the merging vehicle and the detection value of the relative speed Vxrdet of the merging vehicle.

Then, when the maximum front or back vehicle is located on the front side of the ego vehicle, the interruption prediction unit 54 decreases the interruption probability of the front side calculated based on the distance D between the boundary line and the merging vehicle, by an increase and decrease amount, and increases the interruption probability of the back side by the increase and decrease amount. On the other hand, when the maximum front or back vehicle is located on the back side of the ego vehicle, the interruption prediction unit 54 decreases the interruption probability of the back side calculated based on the distance D between the boundary line and the merging vehicle, by the increase and decrease amount, and increases the interruption probability of the front side by the increase and decrease amount. As the time to collision of the maximum front or back vehicle becomes small, the increase and decrease amount is increased.

Then, the interruption prediction unit 54 finally predicts that the merging vehicle interrupts to either bigger one of the interruption probability of the front side or the interruption probability of the back side after increase and decrease.

3. Embodiment 3

Next, the lane change prediction system 1 and the vehicle control apparatus 50 according to Embodiment 3 will be explained. The explanation for constituent parts the same as that of Embodiment 1 or 2 will be omitted. The basic configuration of the lane change prediction system 1 and the vehicle control apparatus 50 according to the present embodiment is the same as that of Embodiment 1 or 2. Embodiment 3 is different from Embodiment 1 or 2 in that the weighting factor W is updated based on the past interruption result.

Figure 16:
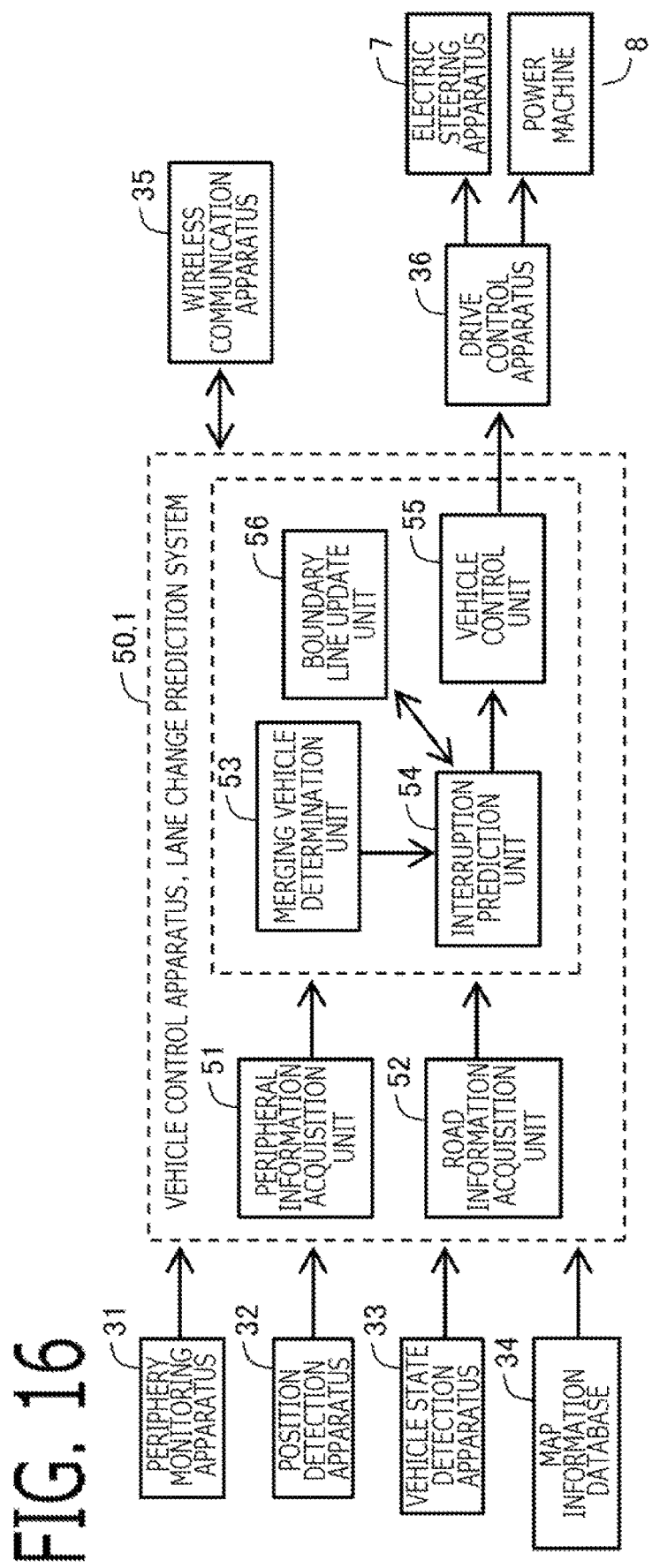
FIG. 16 is a schematic block diagram of the vehicle control apparatus and the lane change prediction system according to Embodiment 3.

As shown in FIG. 16, in the present embodiment, the lane change prediction system 1 (vehicle control apparatus 50) is further provided with a boundary line update unit 56. Using the past interruption result, and the past detection value of the relative position Xrdet and the past detection value of the relative speed Vxrdet of the merging vehicle corresponding to the past interruption result, the boundary line update unit 56 updates the boundary line so that an interruption prediction using the past detection value of the relative position Xrdet, the past detection value of the relative speed Vxrdet of the merging vehicle, and the boundary line approaches the past interruption result.

The boundary line update unit 56 updates the weighting factor W as the boundary line. In the present embodiment, since the weighting factor W is set for every feature of the merging lane and the main lane, the weighting factor W is updated for every feature of the merging lane and the main lane. That is, the boundary line update unit 56 updates the weighting factor W corresponding to the feature of the merging lane and the main lane from which the past interruption result, and the past detection values of the relative position and the relative speed were obtained. Using data set of the plurality of past interruption results, and the plurality of past detection values of the relative positions and the relative speeds, which were obtained for the same feature of the merging lane and the main lane, the boundary line update unit 56 updates the weighting factor W corresponding to the feature of the merging lane and the main lane.

Updating Using Method of Gradient Descent

In the following, a method for updating the weighting factor W using the method of gradient descent will be explained. The boundary line is classified as a positive example, when the equation (11) is established.

$$Xr + sgn(Vxr) \times W \times Vxr^2 > \quad (11)$$

A correct answer label is $L \in \{+1, -1\}$. When the past interruption result is the interruption of the front side, L=1 is set. When the past interruption result is the interruption of the back side, L=-1 is set. When the sign of $(Xr+sgn(Vxr) \times W \times Vxr^2)$ and the sign of L coincide, the prediction result becomes the correct answer. When both signs does not coincide, the prediction result becomes the incorrect answer.

A total error E of N sample data included in the data set is expressed by the equation (12). Herein, R (A) is a function which outputs A when A is a positive value, and outputs 0 when A is a negative value. When the sign of $(Xr_n+sgn(Vxr_n) \times W \times Vxr^2)$ and $L_n$ of each sample data n does not coincide (when it is the incorrect answer), A becomes the positive value, and the output of the function R becomes $(Xr_n+sgn(Vxr_n) \times W \times Vxr^2)$. When both signs coincide (when it is the correct answer), A becomes the negative value, and the output of the function R becomes 0. That is to say, only in the case of the incorrect answer, the error is counted.

$$E(W) = \sum_{n=1}^{N} R\left(-\left(Xr_n + sgn(Vxr_n) \times W \times Vxr_n^2\right) \times L_n\right) \quad (12)$$

$$R(A) = \begin{cases} A & \text{if } A \geq 0 \\ 0 & \text{if } A < 0 \end{cases}$$

When the total error E (W) is differentiated with the weighting factor W, the equation (13) is obtained. Herein, R (sgn( . . . )) becomes 1 when the prediction result is the incorrect answer, and becomes 0 when the prediction result is the correct answer.

$$\frac{dE(W)}{dW} = \sum_{n=1}^{N} \frac{dR\left(-\left(Xr_n + sgn(Vxr_n) \times W \times Vxr_n^2\right) \times L_n\right)}{dW} = \quad (13)$$

$$\sum_{n=1}^{N} Vxr_n^2 \times L_n \times R\left(sgn\left(-\left(Xr_n + sgn(Vxr_n) \times W \times Vxr_n^2\right) \times L_n\right)\right)$$

Then, the weighting factor W is updated using the equation (14). Herein, $\eta$ is an updating coefficient, and W' is a weighting factor after update.

$$W' = W - \eta \frac{dE(W)}{dW} \quad (14)$$

Until the weighting factor W converges, the update process from the equation (12) to the equation (14) is repeated using the same N sample data. When the weighting factor W converges and the update process is ended, the weighting factor W after update is stored in the storage apparatus by correlating with the feature of the merging lane and the main lane corresponding to the data set used for updating; and is used for processing of the interruption prediction unit 54.

Figure 17:
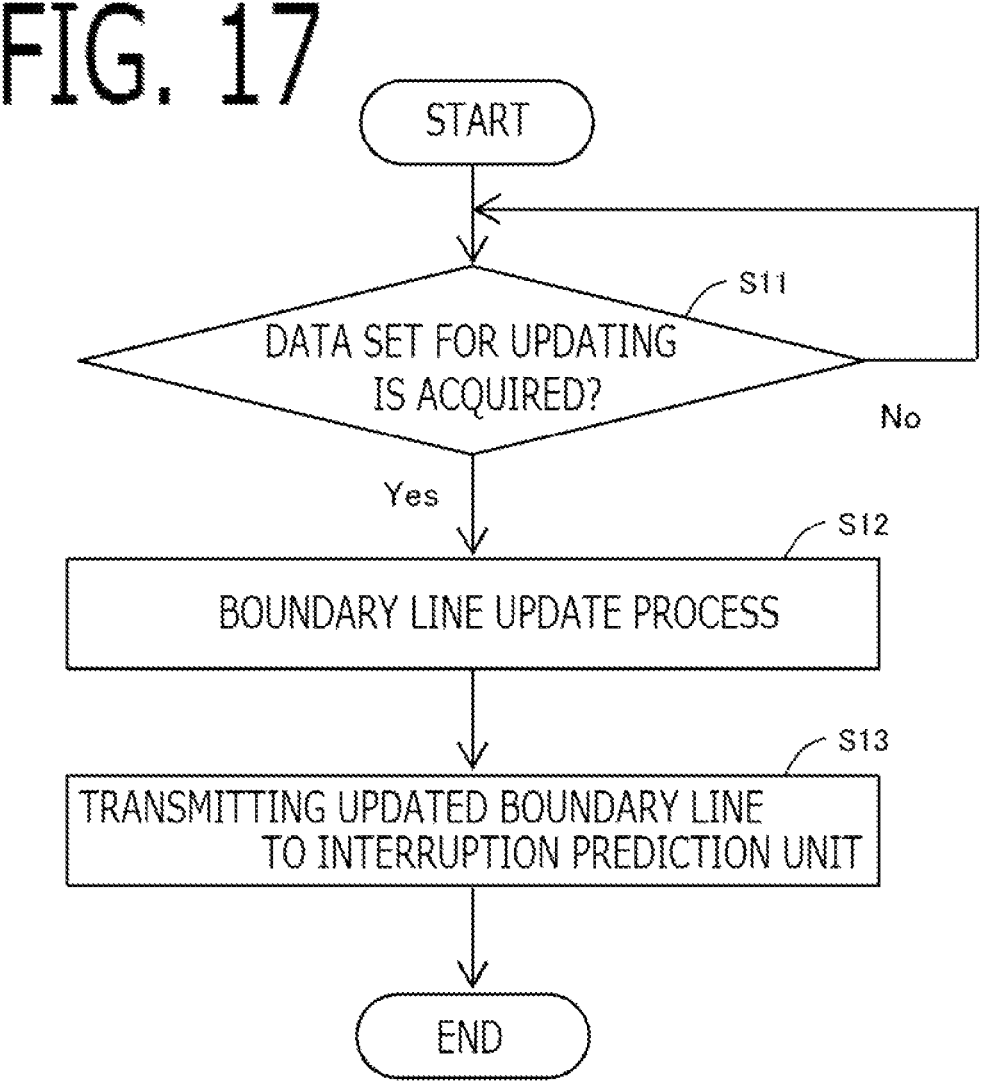
FIG. 17 is a flowchart explaining the boundary line update process according to Embodiment 3.

FIG. 17 is a flowchart explaining processing of the boundary line update unit 56 according to the present embodiment. In the step S11, the boundary line update unit 56 determines whether or not data set for update of the boundary line is acquired. When it is acquired, it advances to the step S12.

In the step S12, as mentioned above, using the past interruption result, and the past detection value of the relative position Xrdet and the past detection value of the relative speed Vxrdet of the merging vehicle corresponding to the past interruption result, the boundary line update unit 56 updates the boundary line so that an interruption prediction using the past detection value of the relative position Xrdet, the past detection value of the relative speed Vxrdet of the merging vehicle, and the boundary line approaches the past interruption result. In the present embodiment, as mentioned above, until the weighting factor W converges, the weighting factor W is repeatedly updated using the method of gradient descent.

In the step S13, as mentioned above, the boundary line update unit 56 transmits the updated boundary line (the weighting factor W) to the interruption prediction unit 54, and makes the interruption prediction unit 54 use it for the interruption prediction.

The boundary line update unit 56 may be provided in a server connected to the network. That is, the boundary line update unit 56 may update the weighting factor W using data collected from many vehicles, and may transmit the updated weighting factor W to each vehicle which is provided with the interruption prediction unit 54 via the network. Since the weighting factor W can be updated using many data collected from many vehicles, update speed and update accuracy of the weighting factor W can be improved.

4. Embodiment 4

Next, the lane change prediction system 1 and the vehicle control apparatus 50 according to Embodiment 4 will be explained. The explanation for constituent parts the same as those in each of Embodiments 1, 2, or 3 will be omitted. The basic configuration of the lane change prediction system 1 and the vehicle control apparatus 50 according to the present embodiment is the same as that of Embodiment 1, 2, or 3. Embodiment 4 is different from Embodiment 1, 2, or 3 in that standardized data is used for estimation using the boundary line.

In the present embodiment, as shown in the equation (15), a standardized relative position Xrnrm and a standardized relative speed Vxrnrm of the merging vehicle are used for estimation using the boundary line. Similarly, as shown in the equation (16), a detection value of the standardized relative position Xrdetnrm and a detection value of the standardized relative speed Vxrdetnrm of the merging vehicle are used for estimation using the boundary line.

$$Xr_{nrm} = \frac{Xr - Xr_{ave}}{\sigma_{Xr}}, \; Vxr_{nrm} = \frac{Vxr - Vxr_{ave}}{\sigma_{Vxr}} \tag{15}$$

$$Xrdet_{nrm} = \frac{Xrdet - Xr_{ave}}{\sigma_{Xr}}, \; Vxrdet_{nrm} = \frac{Vxrdet - Vxr_{ave}}{\sigma_{Vxr}} \tag{16}$$

Herein, Xrave is an average value of the plurality of detection values of the relative position Xrdet used for setting of the boundary line (weighting factor W). σXr is a standard deviation of the plurality of detection values of the relative position Xrdet used for setting of the boundary line (weighting factor W). Vxrave is an average value of the plurality of detection values of the relative speed Vxrdet used for setting of the boundary line (weighting factor W). σVxr is a standard deviation of the plurality of detection values of the relative speed Vxrdet used for setting of the boundary line (weighting factor W). For example, in Embodiment 3, the average value and the standard deviation of each value of the data set used for update of corresponding weighting factor W are stored together with the weighting factor W, and are used for the standardization processing.

Then, as shown in the equation (17), the boundary line is set in a two-dimensional coordinate system which has axes of the standardized relative position Xrnrm and the standardized relative speed Vxrnrm. Herein, Wnrm expresses the weighting factor set in the standardized coordinate system. In this case, in Embodiment 3, the weighting factor Wnrm is updated in the standardized coordinate system.

$$Xr_{nrm} = -sgn(Vxr_{nrm}) \times W_{nrm} \times Vxr_{nrm}^2 \tag{17}$$

$$w_{nrm} > 0$$

1) In the case of $Vxr_{nrm} > 0$, $$sgn(Vxr_{nrm}) = 1$$

2) In the case of $Vxr_{nrm} < 0$, $$sgn(Vxr_{nrm}) = -1$$

Then, the interruption prediction unit 54 predicts that the merging vehicle interrupts on the front side of the ego vehicle, when the equation (18) is satisfied; and predicts that the merging vehicle interrupts on the back side of the ego vehicle, when the equation (19) is satisfied.

$$Xrdet_{nrm} + sgn(Vxr_{nrm}) \times W_{nrm} \times Vxr_{nrm}^2 > 0 \tag{18}$$

$$Xrdet_{nrm} + sgn(Vxr_{nrm}) \times W_{nrm} \times Vxr_{nrm}^2 < 0 \tag{19}$$

Since other processings are similar except being performed on the standardized coordinate system, explanation is omitted.

In this way, since the interruption prediction is performed in the standardized coordinate system, the accuracy of interruption prediction can be maintained against data variation.

Other Embodiments

In each of the above-mentioned embodiments, there was explained the case where the lane change prediction system 1 is provided in the ego vehicle (object vehicle). However, a part or all of the lane change prediction system 1 (at least the interruption prediction unit 54) may be provided in the server connected to the network. In this case, the object vehicle is set to each control object vehicle which exists within an area where the interruption prediction unit 54 is controlling. And, when the merging vehicle corresponding to each control object vehicle exists, the interruption prediction unit 54 may predict whether the merging vehicle interrupts on the front side or the back side of each control object vehicle, based on each information acquired from each control object vehicle. Then, the interruption prediction unit 54 may transmit the interruption prediction result of each control object vehicle and the like to the corresponding control object vehicle, and may make it reflect on the vehicle control of the control object vehicle. As mentioned above, if the boundary line update unit 56 is provided in the server, the boundary line update unit 56 may update the weighting factor W using data collected from each vehicle which exists within the controlled area; and may transmit the updated weighting factor W to the interruption prediction unit 54 which is provided in the server or each vehicle.

Summary of Aspects of the Present Disclosure

Hereinafter, the aspects of the present disclosure is summarized as appendixes.

Appendix 1

A lane change prediction system comprising:
a peripheral information acquisition unit that detects a peripheral vehicle which exist around an object vehicle, and detects a relative position and a relative speed of the peripheral vehicle with respect to the object vehicle in a longitudinal direction of the object vehicle;
a road information acquisition unit that acquires lane information where the object vehicle is traveling, and lane information where the peripheral vehicle is traveling;
a merging vehicle determination unit that determines whether or not the peripheral vehicle is a merging vehicle which merges to a lane where the object vehicle is traveling, based on the lane information where the object vehicle is traveling, and the lane information where the peripheral vehicle is traveling; and an interruption prediction unit that, when the peripheral vehicle is the merging vehicle, predicts whether the merging vehicle interrupts on a front side or a back side of the object vehicle, based on a detection value of the relative position, a detection value of the relative speed, and a positive or negative of the detection value of the relative speed.

Appendix 2

The lane change prediction system according to appendix 1, wherein the interruption prediction unit sets a boundary line in a two-dimensional coordinate system which has axes of the relative position and the relative speed; and predicts whether the merging vehicle interrupts on the front side or the back side of the object vehicle, based on a relative position relation of the detection value of the relative position and the detection value of the relative speed with respect to the boundary line.

Appendix 3

The lane change prediction system according to appendix 2, wherein a front side in the longitudinal direction of the object vehicle is defined as a positive side, and a back side is defined as a negative side, wherein the interruption prediction unit sets, as the boundary line, a curved line that a value obtained by multiplying a negative weighting factor to a square value of the relative speed becomes the relative position, when the relative speed is a positive value, and that a value obtained by multiplying a positive weighting factor to a square value of the relative speed becomes the relative position, when the relative speed is a negative value;

when the detection value of the relative position and the detection value of the relative speed are located on an increase side of the relative position and the relative speed with respect to the boundary line, predicts that the merging vehicle interrupts on the front side of the object vehicle, and when the detection value of the relative position and the detection value of the relative speed are located on a decrease side of the relative position and the relative speed with respect to the boundary line, predicts that the merging vehicle interrupts on the back side of the object vehicle.

Appendix 4

The lane change prediction system according to appendix 3, wherein the interruption prediction unit changes the weighting factor, based on features of a merging lane where the merging vehicle is traveling and a main lane where the object vehicle is traveling.

Appendix 5

The lane change prediction system according to appendix 3 or 4, wherein the interruption prediction unit changes the weighting factor, based on the detection value of the relative acceleration of the merging vehicle with respect to the object vehicle in the longitudinal direction of the object vehicle.

Appendix 6

The lane change prediction system according to any one of appendixes 3 to 5, wherein the interruption prediction unit decreases an absolute value of the weighting factor, as a distance or a required time from a position of the merging vehicle which is traveling on the merging lane which merges into a traveling lane of the object vehicle, to an end of the merging lane becomes short.

Appendix 7

The lane change prediction system according to appendix 2, wherein a front side in the longitudinal direction of the object vehicle is defined as a positive side, and a back side is defined as a negative side, wherein the interruption prediction unit sets the boundary line that the relative position decreases from 0 as the relative speed increases from 0, and sets the boundary line that the relative position increases from 0 as the relative speed decreases from 0; and when the detection value of the relative position and the detection value of the relative speed are located on an increase side of the relative position and the relative speed with respect to the boundary line, predicts that the merging vehicle interrupts on the front side of the object vehicle, and when the detection value of the relative position and the detection value of the relative speed are located on a decrease side of the relative position and the relative speed with respect to the boundary line, predicts that the merging vehicle interrupts on the back side of the object vehicle.

Appendix 8

The lane change prediction system according to any one of appendixes 2 to 7, wherein the interruption prediction unit increases a predicted interruption probability of the front side or the back side, as a distance between the boundary line, and the detection value of the relative position and the detection value of the relative speed becomes long.

Appendix 9

The lane change prediction system according to any one of appendixes 2 to 8, wherein the interruption prediction unit predicts a vehicle distance between the object vehicle and the merging vehicle at a completion of merging, based on the boundary line, and the detection value of the relative position and the detection value of the relative speed.

Appendix 10

The lane change prediction system according to any one of appendixes 1 to 9,
wherein the interruption prediction unit calculates a collision danger degree between the merging vehicle and a front or back vehicle located in front or back of the object vehicle; determines a maximum front or back vehicle which is the front or back vehicle whose collision danger degree becomes the maximum; decreases an interruption probability of the front side and increases an interruption probability of the back side, when the maximum front or back vehicle is located on the front side of the object vehicle; and decreases the interruption probability of the back side and increases the interruption probability of the front side, when the maximum front or back vehicle is located on the back side of the object vehicle.

Appendix 11

The lane change prediction system according to any one of appendixes 2 to 9, further comprising
a boundary line update unit that, using a past interruption result, and the past detection value of the relative position and the past detection value of the relative speed corresponding to the past interruption result, updates the boundary line so that an interruption prediction using the past detection value of the relative position, the past detection value of the relative speed, and the boundary line approaches the past interruption result.

Appendix 12

The lane change prediction system according to any one of appendixes 1 to 11, further comprising
a vehicle control unit that performs one or both of a speed adjusting control and a lane change control of the object vehicle so that a vehicle distance between the merging vehicle after interruption and the object vehicle is secured, based on an interruption prediction result of the front side or the back side by the interruption prediction unit.

Appendix 13

The lane change prediction system according to any one of appendixes 1 to 12,
wherein the lane change prediction system is provided in the object vehicle.

Appendix 14

The lane change prediction system according to any one of appendixes 1 to 12,
wherein at least the lane change prediction system in the interruption prediction unit is provided in a server.

Appendix 15

A lane change prediction method comprising:
a peripheral information acquisition step of detecting a peripheral vehicle which exist around an object vehicle, and detecting a relative position and a relative speed of the peripheral vehicle with respect to the object vehicle in a longitudinal direction of the object vehicle;
a road information acquisition step of acquiring lane information where the object vehicle is traveling, and lane information where the peripheral vehicle is traveling;
a merging vehicle determination step of determining whether or not the peripheral vehicle is a merging vehicle which merges to a lane where the object vehicle is traveling, based on the lane information where the object vehicle is traveling, and the lane information where the peripheral vehicle is traveling; and an interruption prediction step of predicting whether the merging vehicle interrupts on a front side or a back side of the object vehicle, based on a detection value of the relative position, a detection value of the relative speed, and a positive or negative of the detection value of the relative speed, when the peripheral vehicle is the merging vehicle.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1: Lane Change Prediction System, 50: Vehicle Control Apparatus, 51: Peripheral Information Acquisition Unit, 52: Road Information Acquisition Unit, 53: Merging Vehicle Determination Unit, 54: Interruption Prediction Unit, 55: Vehicle Control Unit, 56: Boundary Line Update Unit, Vxr: Relative speed, Vxrdet: Detection value of relative speed, W: Weighting factor, X: Longitudinal direction of ego vehicle, Xr: Relative position, Xrdet: Detection value of relative position, αxrdet: Detection value of relative acceleration

What is claimed is:

1. A lane change prediction system comprising at least one processor configured to implement:
detecting a peripheral vehicle, which exist exists around an object vehicle, and a relative position and a relative speed of the peripheral vehicle with respect to the object vehicle in a longitudinal direction of the object vehicle;
acquiring lane information, where the object vehicle is traveling, and lane information where the peripheral vehicle is traveling;
determining whether or not the peripheral vehicle is a merging vehicle which merges to a lane where the object vehicle is traveling, based on the lane information where the object vehicle is traveling, and the lane information where the peripheral vehicle is traveling;
generating an interruption prediction result based on predicting when the peripheral vehicle is the merging vehicle, whether the merging vehicle interrupts on a front side or a back side of the object vehicle, based on a detection value of the relative position, a detection value of the relative speed, and a positive or negative of the detection value of the relative speed; and performing one or both of a speed adjusting control and a lane change control of the object vehicle so that a vehicle distance between the merging vehicle after interruption and the object vehicle is secured, based on the interruption prediction result.

2. The lane change prediction system according to claim 1, wherein the at least one processor is further configured to implement:

setting a boundary line in a two-dimensional coordinate system which has axes of the relative position and the relative speed; and predicting whether the merging vehicle interrupts on the front side or the back side of the object vehicle, based on a relative position relation of the detection value of the relative position and the detection value of the relative speed with respect to the boundary line.

3. The lane change prediction system according to claim 2, wherein a front side in the longitudinal direction of the object vehicle is defined as a positive side, and a back side is defined as a negative side, and wherein the at least one processor is further configured to implement:

setting, as the boundary line, a curved line that a value obtained by multiplying a negative weighting factor to a square value of the relative speed becomes the relative position, when the relative speed is a positive value, and that a value obtained by multiplying a positive weighting factor to a square value of the relative speed becomes the relative position, when the relative speed is a negative value;

when the detection value of the relative position and the detection value of the relative speed are located on an increase side of the relative position and the relative speed with respect to the boundary line, predicting that the merging vehicle interrupts on the front side of the object vehicle; and when the detection value of the relative position and the detection value of the relative speed are located on a decrease side of the relative position and the relative speed with respect to the boundary line, predicting that the merging vehicle interrupts on the back side of the object vehicle.

4. The lane change prediction system according to claim 3, wherein the at least one processor is further configured to implement changing the weighting factor, based on features of a merging lane where the merging vehicle is traveling and a main lane where the object vehicle is traveling.

5. The lane change prediction system according to claim 3, wherein the at least one processor is further configured to implement changing the weighting factor, based on the detection value of the relative acceleration of the merging vehicle with respect to the object vehicle in the longitudinal direction of the object vehicle.

6. The lane change prediction system according to claim 3, wherein the at least one processor is further configured to implement decreasing an absolute value of the weighting factor, as a distance or a required time from a position of the merging vehicle which is traveling on the merging lane which merges into a traveling lane of the object vehicle, to an end of the merging lane becomes short.

7. The lane change prediction system according to claim 2, wherein a front side in the longitudinal direction of the object vehicle is defined as a positive side, and a back side is defined as a negative side, wherein the at least one processor is further configured to implement:

setting the boundary line that the relative position decreases from 0 as the relative speed increases from 0, and setting the boundary line that the relative position increases from 0 as the relative speed decreases from 0;

when the detection value of the relative position and the detection value of the relative speed are located on an increase side of the relative position and the relative speed with respect to the boundary line, predicting that the merging vehicle interrupts on the front side of the object vehicle; and when the detection value of the relative position and the detection value of the relative speed are located on a decrease side of the relative position and the relative speed with respect to the boundary line, predicting that the merging vehicle interrupts on the back side of the object vehicle.

8. The lane change prediction system according to claim 2, wherein the at least one processor is further configured to implement increasing a predicted interruption probability of the front side or the back side, as a distance between the boundary line, and the detection value of the relative position and the detection value of the relative speed becomes long.

9. The lane change prediction system according to claim 2, wherein the at least one processor is further configured to implement predicting a vehicle distance between the object vehicle and the merging vehicle at a completion of merging, based on the boundary line, and the detection value of the relative position and the detection value of the relative speed.

10. The lane change prediction system according to claim 1, wherein the at least one processor is further configured to implement:

calculating a collision danger degree between the merging vehicle and a front or back vehicle located in front or back of the object vehicle;

determining a maximum front or back vehicle which is the front or back vehicle whose collision danger degree becomes the maximum;

decreasing an interruption probability of the front side and increases an interruption probability of the back side, when the maximum front or back vehicle is located on the front side of the object vehicle; and decreases the interruption probability of the back side and increases the interruption probability of the front side, when the maximum front or back vehicle is located on the back side of the object vehicle.

11. The lane change prediction system according to claim 2, wherein the at least one processor is further configured to implement:

updating, using a past interruption result, and the past detection value of the relative position and the past detection value of the relative speed corresponding to the past interruption result, the boundary line so that an interruption prediction using the past detection value of the relative position, the past detection value of the relative speed, and the boundary line approaches the past interruption result.

12. The lane change prediction system according to claim 1, wherein the lane change prediction system is provided in the object vehicle.

13. The lane change prediction system according to claim 1, wherein at least the lane change prediction system is provided in a server.

14. A lane change prediction method comprising:

detecting a peripheral vehicle which exist around an object vehicle, and detecting a relative position and a relative speed of the peripheral vehicle with respect to the object vehicle in a longitudinal direction of the object vehicle;

acquiring lane information where the object vehicle is traveling, and lane information where the peripheral vehicle is traveling;

determining whether or not the peripheral vehicle is a merging vehicle which merges to a lane where the object vehicle is traveling, based on the lane information where the object vehicle is traveling, and the lane information where the peripheral vehicle is traveling; and generating an interruption prediction result based on predicting whether the merging vehicle interrupts on a front side or a back side of the object vehicle, based on a detection value of the relative position, a detection value of the relative speed, and a positive or negative of the detection value of the relative speed, when the peripheral vehicle is the merging vehicle; and performs one or both of a speed adjusting control and a lane change control of the object vehicle so that a vehicle distance between the merging vehicle after interruption and the object vehicle is secured, based on the interruption prediction result.

* * * * *